United States Patent
Moreton et al.

(10) Patent No.: US 7,233,335 B2
(45) Date of Patent: Jun. 19, 2007

(54) SYSTEM AND METHOD FOR RESERVING AND MANAGING MEMORY SPACES IN A MEMORY RESOURCE

(75) Inventors: Henry P. Moreton, Woodside, CA (US); John Erik Lindholm, Saratoga, CA (US); Matthew N. Papakipos, Palo Alto, CA (US); Rui M. Bastos, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 521 days.

(21) Appl. No.: 10/419,524

(22) Filed: Apr. 21, 2003

(65) Prior Publication Data
US 2004/0207630 A1    Oct. 21, 2004

(51) Int. Cl.
G06T 1/00 (2006.01)
G06F 13/18 (2006.01)
G06F 12/02 (2006.01)
G09G 5/399 (2006.01)

(52) U.S. Cl. .................... 345/522; 345/540; 345/543; 345/535

(58) Field of Classification Search ................ 345/522, 345/426, 420, 540, 543, 535; 718/100, 106, 718/107, 103, 102; 710/200; 711/100, 153, 711/171, 137, 152, 125; 707/8; 719/330; 717/131
See application file for complete search history.

(56) References Cited

U.S. PATENT DOCUMENTS

| | | | |
|---|---|---|---|
| 5,511,192 A * | 4/1996 | Shirakihara | 718/106 |
| 5,892,944 A * | 4/1999 | Fukumoto et al. | 718/100 |
| 6,630,935 B1 * | 10/2003 | Taylor et al. | 345/522 |
| 6,938,252 B2 * | 8/2005 | Baylor et al. | 718/102 |
| 2004/0143833 A1 * | 7/2004 | Heyrman et al. | 718/100 |

* cited by examiner

Primary Examiner—Kee M. Tung
Assistant Examiner—Hau Nguyen
(74) Attorney, Agent, or Firm—Patterson & Sheridan, L.L.P.

(57) ABSTRACT

System and method for reserving a memory space for multithreaded processing is described. Memory space within a memory resource is allocated responsive to thread type. Examples of thread types for graphics processing include primitive, vertex and pixel types. Memory space allocated may be of a predetermined size for a thread type. Memory locations within a first memory space may be interleaved with memory locations within a second memory space.

50 Claims, 11 Drawing Sheets

SYSTEM AND METHOD FOR RESERVING AND MANAGING MEMORY SPACES IN A MEMORY RESOURCE

FIELD OF THE INVENTION

One or more aspects of the invention generally relate to computer graphics, and more particularly to reserving, accessing, and managing memory spaces for use by threads executing on a graphics processor.

DESCRIPTION OF THE BACKGROUND

Conventionally, graphics data is processed on a graphics processor through the use of threads executing on the graphics processor. Threads executing on the graphics processor generate thread data, such as, source data, destination data, and intermediate data generated during execution of the thread. The thread data is typically stored into a first available memory location of a memory resource being used to store thread data. Therefore, thread data generated by a same thread may be located in non-neighboring locations throughout the memory resource.

Conventionally, memory resources storing thread data in non-neighboring locations produce significant cross-thread interaction where one thread inadvertently accesses thread data of another thread. Memory resources storing thread data in non-neighboring locations also produce low access coherency where thread data in neighboring memory locations are unrelated. Access coherency is important in graphics processing since a single read command for a memory location typically accesses the memory location and a group of neighboring memory locations in one retrieval. Therefore, when a read command is performed, it is desirable to have high access coherency so that the group of neighboring memory locations that is read contain related thread data.

SUMMARY

New systems and methods for reserving a memory space in a memory resource for each thread in a first set of threads are disclosed.

A method for memory allocation for a multithreaded processor includes obtaining threads. Sets are created from the threads according to thread type. Memory space for each thread in a set is allocated responsive to the thread type of the set.

A method for allocation of a memory resource for a plurality of threads of at least two thread types simultaneously executable in a graphics processor responsive to a graphics program module includes determining a first set of threads from said plurality of threads of the at least two thread types simultaneously executable in said graphics processor. A memory space to be allocated for each said thread type in said plurality of threads is determined. Said memory space is respectively allocated to each said thread in said first set of threads to respectively reserve said memory space.

A method for allocation of a memory resource for a plurality of threads simultaneously executable in a graphics processor responsive to a graphics program module includes determining a memory space amount for each thread in a first set of threads of said plurality of threads, each said thread of said plurality of threads being associated with said graphics program module executing on said graphics processor. An access command is received from a first thread in said first set of threads. A first memory space is accessed in said memory resource in response to said access command received from said first thread, said first memory space only accessible by said first thread when executing. Another access command is received from a second thread in said first set of threads. A second memory space in said memory resource is accessed in response to said other access command received from said second thread, said second memory space only accessible by said second thread when executing.

A computer program product having a computer readable medium having computer program instructions recorded thereon, said computer program product includes instructions for determining a first set of threads of a plurality of threads, each thread of said plurality of threads being associated with a graphics program module executing on a graphics processor, instructions for determining a memory space amount needed by each thread in said first set of threads and instructions for allocating a memory space in a memory resource to each thread in said first set of threads, said memory space being reserved for said thread to which said memory space is allocated.

Another computer program product having a computer readable medium having computer program instructions recorded thereon, said computer program product includes instructions for determining a memory space amount for each thread in a first set of threads of said plurality of threads, each said thread of said plurality of threads being associated with said graphics program module executing on said graphics processor, instructions for receiving an access command from a first thread in said first set of threads, instructions for accessing a first memory space in said memory resource in response to said access command received from said first thread, said first memory space only accessible by said first thread when executing, instructions for receiving another access command from a second thread in said first set of threads and instructions for accessing a second memory space in said memory resource in response to said other access command received from said second thread, said second memory space only accessible by said second thread when executing.

A computing system includes a memory resource, a graphics processor coupled to said memory resource for executing one or more graphics program modules and a central processing unit (CPU) coupled to said memory resource and said graphics processor. Said CPU determines a first set of threads from said plurality of threads simultaneously executable in said graphics processor, determines a memory space to be allocated for each thread in said first set of threads and respectively allocates said memory space to each said thread in said first set of threads to respectively reserve said memory space.

Another computing system includes a memory resource, a graphics processor coupled to said memory resource for executing one or more graphics program modules and a central processing unit (CPU) coupled to said memory resource and said graphics processor. Said CPU determines a memory space amount needed by each thread in a first set of threads of a plurality of threads, each thread of said plurality of threads being associated with a graphics program module executing on said graphics processor. The computing system includes an address unit coupled to said graphics processor and said CPU. Said address unit receives an access command from a first thread in said first set of threads and receives an access command from a second thread in said first set of threads. The computing system includes a memory controller coupled to said memory resource and said address unit. Said memory controller accesses a first memory space in said memory resource in response to said received access command from said first thread, said first memory space being accessed only by said first thread and accesses a second memory space in said memory resource in response to said received access command from said second thread, said second memory space being accessed only by said second thread.

BRIEF DESCRIPTION OF THE VARIOUS VIEWS OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
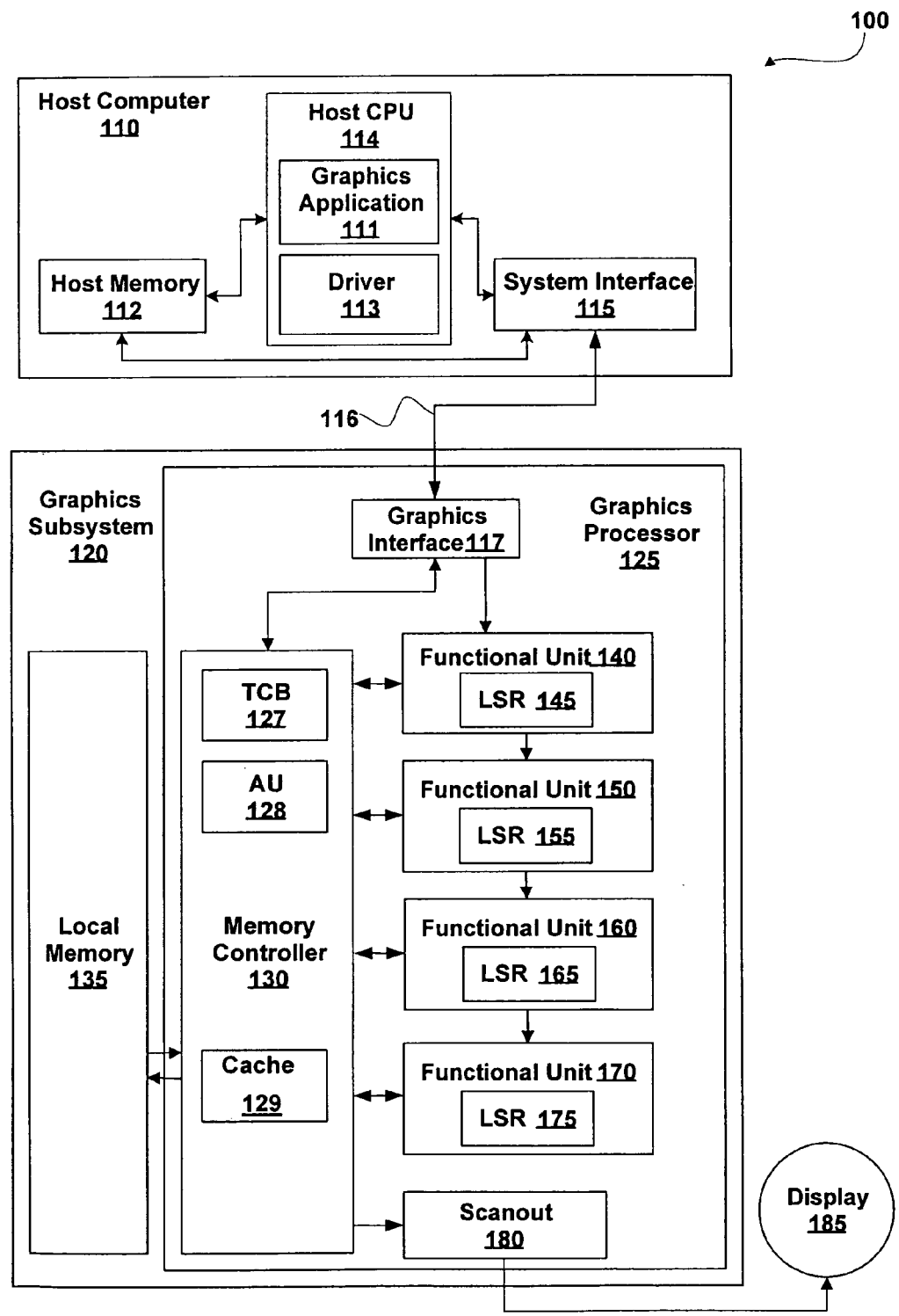
FIG. 1 is a block diagram illustrating a computing system.

FIG. 1 is a block diagram of a Computing System 100 in which embodiments in accordance with one or more aspects of the invention may be used. Computing System 100 may be a desktop computer, server, laptop computer, palm-sized computer, tablet computer, game console, cellular telephone, computer based simulator, or the like. Computing System 100 includes a Host Computer 110, a Graphics Subsystem 120, an "External" Bus 116, and a Display 185. Graphics Subsystem 120 contains a Graphics Processor 125 and a Local Memory 135. By "External Bus," it is meant a bus used to put Host Computer 110 in communication with a subsystem not part of Host Computer 110.

Graphics Processor 125 contains Functional Units 140, 150, 160, and 170, a Graphics Interface 117, a Thread Control Buffer (TCB) 127, an Address Unit (AU) 128, a Memory Controller 130, and a Scanout 180. In an alternative embodiment, Functional Units 140, 150, 160, and 170, each contain a Local Storage Resource (LSR) 145, 155, 165, and 175, respectively. Though a pipeline architecture is shown for Graphics Processor 125, Graphics Processor 125 may be implemented as a multi-processor architecture where Functional Units 140, 150, 160, 170 are not cascaded.

TCB 127 may be located in Memory Controller 130 (as shown), in a Functional Unit 140, 150, 160, or 170, in Graphics Interface 117, or located as a separate device coupled to Memory Controller 130 and a Functional Unit 140, 150, 160, or 170. Likewise, AU 128 may be located in Memory Controller 130 (as shown), in a Functional Unit 140, 150, 160, or 170, in Graphics Interface 117, or located as a separate device coupled to Memory Controller 130 and a Functional Unit 140, 150, 160, or 170. In an alternative embodiment, TCB 127 and AU 128 are integrated on the same chip. One or more embodiments, in accordance with one or more aspects of the invention, to configure TCB 127 and AU 128 include computer program products having a computer readable medium with computer program instructions to perform particular functions of such embodiments.

Host Computer 110 communicates with Graphics Subsystem 120 via External Bus 116 and Graphics Interface 117. Host computer 110 includes a Host Memory 112, a Host Central Processing Unit (CPU) 114, and a System Interface 115. Host CPU 114 may include a system memory controller to interface directly to Host Memory 112. Or Host CPU 114 may interface with System Interface 115 and communicate with Host Memory 112 through System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host Computer 110 loads a Graphics Application 111 into Host Memory 112 and Host CPU 114 executes program instructions of Graphics Application 111. Graphics Application 111 generates streams of graphics data used to generate an image to be displayed on Display 185. Program instructions of Graphics Application 111, subsets of program instructions of Graphics Application 111 (i.e., instruction sets or graphics program modules), and graphics data are read from or stored to a memory resource, e.g., any combination of Host Memory 112, Local Memory 135, and LSR 145, 155, 165, or 175. When a portion of Host Memory 112 is used to store program instructions and graphics data, the portion of Host Memory 112 can be uncached so as to increase performance of access by Graphics Processor 125.

When Graphics Application 111 is loaded to and executed by Host CPU 114, an operating system executing in Host CPU 114 calls a Driver 113. Driver 113 then executes in Host CPU 114. As used herein, Driver 113 is a program interface between Graphics Application 111 and Graphics Processor 125. Driver 113 executes when Graphics Application 111 is active. Driver 113 may include a computer program product having a computer readable medium that includes computer program instructions configured to perform particular functions of one or more embodiments in accordance with one or more aspects of the invention.

Host Computer 110 communicates the graphics data used to generate an image to Graphics Processor 125 via System Interface 115, External Bus 116, and Graphics Interface 117. The graphics data generated by Graphics Application 111 may include a high level description of a scene for display, and other high level information such as from where the scene is to be viewed, what textures should be applied to different primitives in the scene, and where lights are located in the scene. Display 185, however, may be a relatively simple device for accepting and outputting color information on a pixel-by-pixel basis that cannot interpret the high level graphics data from Graphics Application 111.

Therefore, the high level graphics data is processed by Functional Units 140, 150, 160, and 170 of Graphics Processor 125 and translated into pixel color information for the image to be displayed on Display 185. Functional Units 140, 150, 160, and 170 of Graphics Processor 125 are programmable units capable of executing instructions sets of Graphics Application 111. In one embodiment, a Functional Unit 140, 150, 160, or 170 is a programmable vertex processor capable of performing per-vertex computations (such as lighting and time-varying spatial offsets), subdivision surface algorithms (as known in the art), and N-patch algorithms (or "normal patch", as known in the art). In another embodiment, a Functional Unit 140, 150, 160, or 170 is a programmable shader processor capable of performing per-pixel operations, such as texturing, lighting, bump mapping, or the like.

The graphics data processed by Functional Units 140, 150, 160, and 170 of Graphics Processor 125 can be primitive data, surface data, pixel data, vertex data, fragment data, or the like. For simplicity, the remainder of this description will use the term "sample" to refer to primitive data, surface data, pixel data, vertex data, fragment data, or the like. The number of Functional Units 140, 150, 160, and 170 are for illustrative purposes only and Graphics Processor 125 may include more or fewer Functional Units without departing from the spirit or scope of one or more aspects of the invention.

A sample and sample type identifier associated with the sample are received by a Functional Unit 140, 150, 160, or 170. The sample type identifier associated with a sample identifies the sample type of the sample (e.g., pixel sample, vertex sample, fragment sample, or the like.) and determines which particular Functional Unit 140, 150, 160, or 170 receives and processes the sample. For example, if a sample type identifier identifies a sample as a vertex sample and Functional Unit 140 is a vertex processor, the vertex sample is received and processed by Functional Unit 140.

Along with a sample and a sample type identifier associated with the sample, a Functional Unit 140, 150, 160, or 170 receives a pointer to an instruction set associated with the sample. An instruction set (or graphics program module) is a specific subset of program instructions of Graphics Application 111 used to process the associated sample. The instruction set associated with a sample relates to the sample type associated with the sample. For example, if a sample is a vertex sample, the vertex sample is processed according to a vertex instruction set, i.e., an instruction set configured to process vertex samples. The pointer to the associated instruction set locates a memory address in a memory resource (e.g., Host Memory 112, Local Memory 135, LSR 145, 155, 165, or 175, or the like.) where the associated instruction set is found. A same instruction set having a same associated pointer can be used to process several different samples. In an alternative embodiment Memory Controller 130 contains a Cache 129 for caching graphics data and program instructions read from Local Memory 135 or Host Memory 112.

When Functional Unit 140, 150, 160, or 170 receives a sample, a sample type identifier associated with the sample, and a pointer to an instruction set associated with the sample, a thread is assigned to the sample by TCB 127. Graphics Processor 125 can execute a predefined number of threads in parallel. TCB 127 includes storage resources to retain thread state data to track the number of threads previously assigned to other samples and the number of threads still available. In an alternative embodiment, the storage resources of TCB 127 also contain a thread type identifier for each thread to enable TCB 127 to assign a thread to a sample based on the thread type identifier of the thread and the sample type identifier of the sample.

As used herein, a thread is a set of processes for processing a sample according to an instruction set associated with the sample. A thread assigned to a sample uses a pointer to locate the instruction set associated with the sample and loads and executes the instruction set on the Functional Unit 140, 150, 160, or 170 that received the sample. The thread then processes the sample according to the associated instruction set executing on the Functional Unit 140, 150, 160, or 170 that received the sample. Graphics Processor 125 contains one or more Functional Units 140, 150, 160, or 170 and can process one or more threads simultaneously, each thread executing an associated instruction set (or graphics program module) on a Functional Unit 140, 150, 160, or 170.

Each thread of a plurality of threads executing on Graphics Processor 125 uses a predefined amount of memory space for storing thread data generated by the thread during its execution. Thread data to be stored in memory space include, for example, source data, destination data, and intermediate data generated during execution of the thread. A memory space used for storing thread data can be located in Host Memory 112, a peripheral memory resource (not shown) coupled to System Interface 115 (e.g., hard drive, Zip drive, tape drive, CD-R, CD-RW, etc.), a graphics memory resource, such as Local Memory 135 or LSR 145, 155, 165, or 175, or any combination of the above. Memory spaces in a memory resource for use by threads of Graphics Processor 125 are allocated and managed in accordance with one or more aspects of the invention as described in relation to exemplary embodiments illustratively shown in FIGS. 3A, 3B, 4A, and 4B.

In an alternative embodiment, threads executing on Graphics Processor 125 can be of different thread types configured to process samples of different sample types. Threads of different thread types may use different memory space amounts for storing thread data. A thread type of a thread is identified by a thread type identifier and a sample type of a sample is identified by a sample type identifier. TCB 127 assigns threads of a particular thread type to match samples of a particular sample type by matching the thread type identifier of the thread with the sample type identifier of the sample. For example, a vertex sample is processed by a vertex thread and a pixel sample is processed by a pixel thread, the vertex thread may use a greater memory space amount than the pixel thread. Furthermore, another sample type, such as a primitive sample is processed by a primitive thread, the primitive thread may use a different memory space amount than either the pixel thread or the vertex thread.

In an alternate embodiment, threads of a same thread type may use different memory space amounts for storing thread data. A memory space amount for a thread is dynamically allocated by TCB 127 prior to execution of the thread. A thread memory space is specified for each thread by Graphics Application 111 and is included in the program instructions output to Graphics Processor 125.

As stated above, a thread processes a sample according to an instruction set associated with the sample, the instruction set executing on the Functional Unit 140, 150, 160, or 170 that received the sample. During the processing of the sample, the thread executes an instruction in the instruction set that generates an access command (i.e., read, or write command) for a memory space reserved for the thread. If the memory space reserved for the thread is implemented as a stack, the access command can be referred to as a "push" or "pop" command. Memory spaces in a memory resource for use by threads of Graphics Processor 125 are reserved or managed in accordance with one or more aspects of the invention as described in relation to exemplary embodiments illustratively shown in FIGS. 3A, 3B, 4A, and 4B.

An access command produced by a thread executing on a Functional Unit 140, 150, 160, or 170 is sent to AU 128 for further processing. An access command includes an operation command (i.e., read or write) and address request information. Address request information is used by AU 128 in determining the memory location address of a memory location in memory space that the access command is to access in accordance with one or more aspects of the invention as described in relation to exemplary embodiments illustratively shown in FIGS. 3A, 3B, 4A, and 4B.

AU 128 includes an AU computational unit and an AU storage unit. The AU computational unit determines memory location addresses for received access commands using a look-up table or a predefined computation. The AU computational unit can be hard-wired to perform these functions or be configured by a software program to perform the functions. The AU storage unit is used to store memory location address computation information needed by the AU computational unit to determine memory location addresses for received access commands. The AU storage unit and the AU computational unit may be on separate chips or integrated on the same chip. Memory location addresses of memory locations in a memory space allocated to a thread are determined in accordance with one or more aspects of the invention as described in relation to exemplary embodiments illustratively shown in FIGS. 3A, 3B, 4A, and 4B.

After AU 128 determines a memory location address for a received access command, the memory location address and operation command are sent to Memory Controller 130. Memory Controller 130 arbitrates between hardware components of Graphics Subsystem 120 initiating access commands to memory resources containing memory spaces used by threads executing on Graphics Processor 125. Examples of such memory resources are Host Memory 112, a peripheral memory resource (not shown) coupled to System Interface 115 (e.g., hard drive, Zip drive, tape drive, CD-R, CD-RW, or the like), a graphics memory resource, such as Local Memory 135 or LSR 145, 155, 165, or 175, or any combination of the above. Memory Controller 130 receives the memory location address and operation command and accesses the memory location identified by the memory location address according to the operation command.

In an alternate embodiment AU 128 identifies and avoids read-after-write (RAW) hazards using a method known in the art. RAW hazards can occur when write operations are coalesced such that order is not maintained between read and write operation commands for each memory location received by Memory Controller 130 from AU 128. For example, a RAW hazard occurs when a coalesced write to a memory location is delayed such that a read from the memory location occurs before instead of after the write to the memory location. Likewise, RAW hazards can occur when order is not maintained between read and write operation commands for each memory location received by Local Memory 135 or Host Memory 112 from Memory Controller 130.

Figure 2:
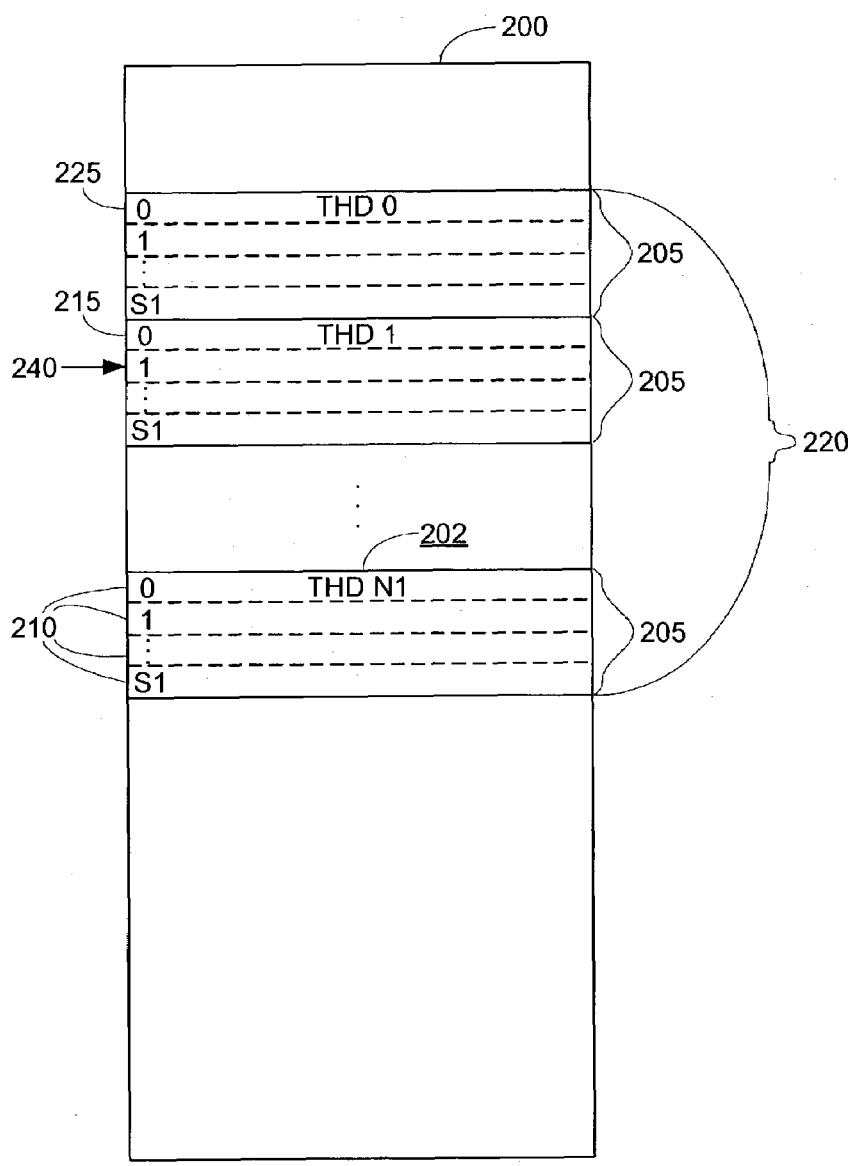
FIG. 2 is a block diagram of a memory resource containing memory spaces that are reserved, accessed, or managed according to a memory space reservation process.

FIG. 2 shows a block diagram of a Memory Resource 200 containing Memory Spaces 205 that are reserved, accessed, or managed according to according a memory space reservation process. FIG. 2 is described in relation to FIG. 1.

Memory Resource 200 can be Host Memory 112, a peripheral memory resource (not shown) coupled to System Interface 115 (e.g., hard drive, Zip drive, CD tape drive, CD-R, CD-RW, or the like), a graphics memory resource (such as Local Memory 135 or LSR 145, 155, 165, or 175), or any combination of the above. Memory Resource 200 or portions of Memory Resource 200 (e.g., Memory Space 205) can be implemented in various configurations, for example, as a stack, cache, FIFO, or to support random access. Memory Resource 200 or portions of Memory Resource 200 (e.g., Memory Space 205) can be of different memory types, for example, a set of registers, RAM, DRAM, or the like. Memory Resource 200 can be internal to Graphics Processor 125 (i.e., located on the same chip as Graphics Processor 125) such as LSR 145, 155, 165, or 175. Memory Resource 200 can also be external to Graphics Processor 125 (i.e., not located on the same chip as Graphics Processor 125), such as Host Memory 112, Local Memory 135, or a peripheral memory resource. Additionally, Memory Resource 200 can include a memory resource internal to Graphics Processor 125 and a memory resource external to Graphics Processor 125.

Memory Resource 200 contains at least two Memory Spaces 205 for use by threads of a first set of threads executing on Graphics Processor 125. The first set of threads can include all threads executing on Graphics Processor 125 or a subset of all threads executing on Graphics Processor 125. A Memory Space 205 is reserved for each thread in the first set of threads. Each thread in the first set of threads is identified by a Thread Identification Number (THD#) 202, the THD# 202 of a thread in the first set of threads being an order number of the thread in the first set of threads. In the example shown in FIG. 2, THD#s 202 range from 0 through N1 and the first set of threads includes N1+1 threads.

Each Memory Space 205 contains at least one Memory Location 210. Each Memory Location 210 is identified by a unique memory location address and has a memory location size or width. A size of a Memory Space 205 (or memory space size) is equal to the number of Memory Locations 210 contained in Memory Space 205 multiplied by the size of a Memory Location 210. The size of a Memory Location 210 can be any number of bits as specified in hardware or software. For simplicity, as used herein, the size of a Memory Location 210 is represented as being equal to 1. Therefore, in the example shown in FIG. 2, the first memory space size of each Memory Space 205 is S1+1.

A first Memory Location 210 of Memory Space 205 is defined as a Base Memory Space Location 215, the Base Memory Space Location 215 having a unique memory location address. As used herein, the memory location address of Base Memory Space Location 215 is also referred to as a base memory space address of Memory Space 205. If Memory Space 205 is implemented as a stack, thread data is accessed from Memory Space 205 starting from Base Memory Space Location 215 of Memory Space 205. In other words, thread data is stored to ("pushed") and read from ("popped") a "top" of Memory Space 205.

Memory Spaces 205 reserved for threads of the first set of threads includes a Memory Section 220. A first Memory Location 210 of Memory Section 220 is defined as a Base Memory Section Location 225, the Base Memory Section Location 225 having a unique memory location address. As used herein, the memory location address of Base Memory Section Location 225 is also referred to as a base memory section address of Memory Section 220. As shown in FIG.

2, Base Memory Section Location 225 of Memory Section 220 is also Base Memory Space Location 215 for the Memory Space 205 reserved for a thread having THD# 202 of 0. A size of Memory Section 220 is equal to the sum of the memory space sizes of Memory Spaces 205 allocated to threads of the first set of threads.

Figure 3A:
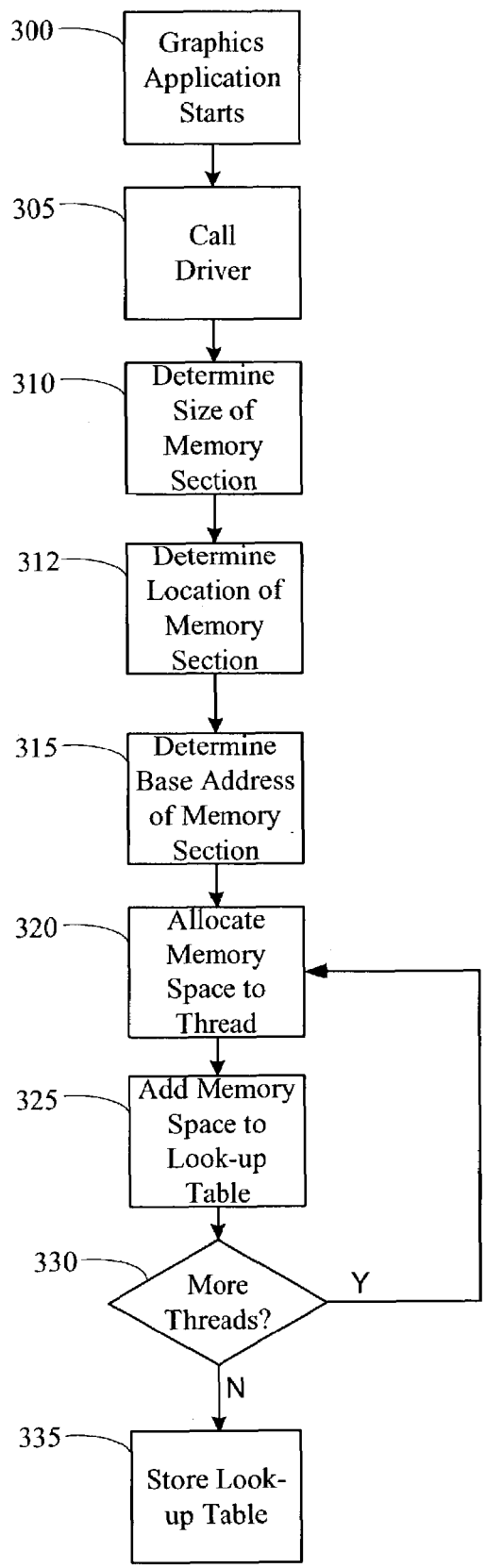
FIG. 3A shows a flowchart for reserving memory spaces for threads of a first set of threads executing on a graphics processor.

FIG. 3A shows a flowchart of a method for reserving Memory Spaces 205 for threads of a first set of threads executing on Graphics Processor 125. FIG. 3A is described in relation to FIGS. 1 and 2.

At step 300, Host Computer 110 loads Graphics Application 111 into Host Memory 112 and Host CPU 114 executes program instructions of Graphics Application 111. Program instructions of Graphics Application 111, instruction sets or graphics program modules of Graphics Application 111 to be executed by Graphics Processor 125, and graphics data generated by Graphics Application 111 are read from or stored to a memory resource, e.g., any combination of Host Memory 112, Local Memory 135, and LSR 145, 155, 165, or 175.

At step 305, an operating system executing in Host CPU 114 calls Driver 113 and Driver 113 executes in Host CPU 114. As stated above, Driver 113 is a program interface between Graphics Application 111 and Graphics Processor 125. Driver 113 determines information relating to Graphics Processor 125 including a number of threads Graphics Processor 125 is capable of executing simultaneously, an amount of memory space used by each thread, and a size of memory space available in graphics memory resources (such as Local Memory 135 and LSR 145, 155, 165, or 175) located on Graphics Processor 125. The information relating to Graphics Processor 125 may be contained in Driver 113. In a further alternative embodiment, the information relating to Graphics Processor 125 is hard-wired in AU 128 or specified in Graphics Application 111 or another program from which Driver 113 or AU 128 can receive the information.

At step 310, Driver 113 determines a size of Memory Section 220 in Memory Resource 200 to be reserved for a first set of threads that will execute on Graphics Processor 125. To do so, Driver 113 determines a number of threads in the first set of threads which is equal to or less than the number of threads Graphics Processor 125 is capable of executing simultaneously. In the example shown in FIG. 2, the first set of threads includes N1+1 threads.

Driver 113 also determines a first memory space size of a Memory Space 205 to be reserved for each thread in the first set of threads, the first memory space size being equal to or greater than the amount of memory space used by each thread. In the example shown in FIG. 2, the first memory space size of each Memory Space 205 is (S1+1). The memory space size of a Memory Space 205 is equal to the number of Memory Locations 210 contained in Memory Space 205. Driver 113 then multiplies the number of threads in the first set of threads with the first memory space size to determine the size of Memory Section 220 in Memory Resource 200.

At step 312, Driver 113 determines which Memory Resource 200 is to contain Memory Section 220. Examples of Memory Resource 200 candidates are Host Memory 112, a peripheral memory resource (not shown) coupled to System Interface 115 (e.g., hard drive, Zip drive, tape drive, CD-R, CD-RW, or the like), a graphics memory resource, such as Local Memory 135 or LSR 145, 155, 165, or 175, or any combination of the above. If the size of memory space available in graphics memory resources located on Graphics Processor 125 is equal to or greater than the size of Memory Section 220 determined at step 310, Driver 113 may determine that a graphics memory resource (such as Local Memory 135 and LSR 145, 155, 165, or 175) is to contain Memory Section 220. In this case, at step 315, Driver 113 assigns a base memory section address for Memory Section 220. If Driver 113 determines that Host Memory 112 or a peripheral memory resource (not shown) coupled to System Interface 115 is to contain Memory Section 220, Driver 113 receives, at step 315, a base memory section address for Memory Section 220 from Host CPU 114. As used herein, the first memory space size of a Memory Space 205 in Memory Section 220 and the base memory section address for Memory Section 220 are referred to as memory section information for Memory Section 220.

At step 320, Driver 113 allocates a Memory Space 205 to a thread in the first set of threads, starting with a thread having a THD# 202 of 0. Driver 113 identifies a base memory space address of Memory Space 205 (i.e., a memory location address of a Base Memory Space Location 215 of Memory Space 205) to be allocated to the thread. In an alternative embodiment, at step 320, Driver 113 also identifies a memory location address for each Memory Location 210 in Memory Space 205. The memory location address for a Memory Location 210 in Memory Space 205 is determined from the base memory space address of Memory Space 205 and a memory location offset, such as a memory location offset ranging from 0 to S1. Each Memory Location 210 in Memory Space 205 has an associated memory location offset, Base Memory Space Location 215 having an associated memory location offset of 0. As stated above, as used herein, the size of a Memory Location 210 is represented as being equal to 1. Therefore, in the example shown in FIG. 2, the memory location offsets range from 0 to S1.

If Memory Section 220 is implemented as a stack, Driver 113 identifies the base memory space address for Memory Space 205 allocated to a thread using a first predefined computation. The first predefined computation may be a following predefined equation:

base memory section address of Memory Section 220+(THD# 202*first memory space size).

In an alternative embodiment, Memory Section 220 is implemented to support random access. In this case, Driver 113 identifies a memory location address for each Memory Location 210 (including a base memory space address for Base Memory Space Location 215) in Memory Space 205 using a second predefined computation. The second predefined computation may be a following predefined equation:

base memory section address of Memory Section 220+(THD# 202*first memory space size)+ memory location offset.

For example, as shown in FIG. 2, a base memory space address of Memory Space 205 reserved for a thread having THD# 202 of 1 is determined by the sum of the base memory section address for Memory Section 220 (the memory location address of Base Memory Section Location 225) and 1 (THD# 202) multiplied by S1+1 (first memory space size). If Memory Section 220 is implemented to support random access, the memory location address of Example Memory Location 240 can be determined by the sum of the base memory space address of Memory Space 205 reserved for the thread having THD# 202 of 1 (as determined above) and a memory location offset (equal to 1) associated with Example Memory Location 240.

In an alternative embodiment, the first predefined computation is a following predefined order of concatenation:

{base memory section address for Memory Section 220, THD#202, memory location offset of 0}.

Prior to concatenation, the base memory section address for Memory Section 220 may be truncated to preserve a number of high bits. The number of bits used to represent each component, e.g., base memory section address for Memory Section 220, memory location offset of 0, THD# 202, in the concatenation is fixed at a number of bits needed to represent the largest possible value for that component. For example the number of bits used to represent memory location offset of 0 and memory location offset is $\log_2$(first memory space size) and the number of bits used to represent THD# 202 is $\log_2$(N1+1). In a further embodiment, the second predefined computation is a following predefined order of concatenation:

{base memory section address for Memory Section 220, THD#202, memory location offset}.

At step 325, the THD# 202 of the thread allocated Memory Space 205 (at step 320) and the base memory space address of the allocated Memory Space 205 are added to a look-up table. This step is referred to as adding a Memory Space 205 to the look-up table. The look-up table is used to keep a record of Memory Spaces 205 allocated to threads in the first set of threads.

At step 325, if the allocated Memory Space 205 is implemented to support random access, a memory location offset associated with each Memory Location 210 in the allocated Memory Space 205 and a memory location address for each Memory Location 210 are also added to the look-up table. This is also referred to as adding a Memory Space 205 to the look-up table.

At step 330, Driver 113 determines if there is another thread in the first set of threads to be allocated a Memory Space 205. If so, at step 320, a thread having a next order number (i.e., a next THD# 202) in the first set of threads is allocated a Memory Space 205 by Driver 113. At step 330, the allocated Memory Space 205 is added to the look-up table. In the example shown in FIG. 2, N1+1 threads in the first set of threads are allocated a Memory Space 205, each Memory Space 205 being reserved for the thread to which it is allocated.

If Driver 113 determines that there are no other threads in the first set of threads to be allocated a Memory Space 205, the method proceeds to step 335. At step 335, the look-up table is stored to AU 128.

In a further embodiment, the information relating to Graphics Processor 125 is stored to AU 128 at step 305. As described above, information relating to Graphics Processor 125 includes a number of threads Graphics Processor 125 is capable of executing simultaneously, an amount of memory space used by each thread, and a size of memory space available in graphics memory resources located on Graphics Processor 125. Steps 310 through 330 are then performed by AU 128 instead of Driver 113. For example, at step 310, AU 128 determines the size of Memory Section 220 reserved for the first set of threads by multiplying the number of threads in the first set of threads with the first memory space size. At step 312, AU 128 determines which Memory Resource 200 is to contain Memory Section 220 and loads the base memory section address for Memory Section 220 from Driver 113 or Host CPU 114. At steps 320 through 330, AU 128 allocates a Memory Space 205 for each thread in the first set of threads, a record of the allocations being stored in a look-up table. AU 128 can be hard-wired to perform the functions used in steps 310 through 330 or be configured by a software program to perform the functions used in steps 310 through 330.

Figure 3B:
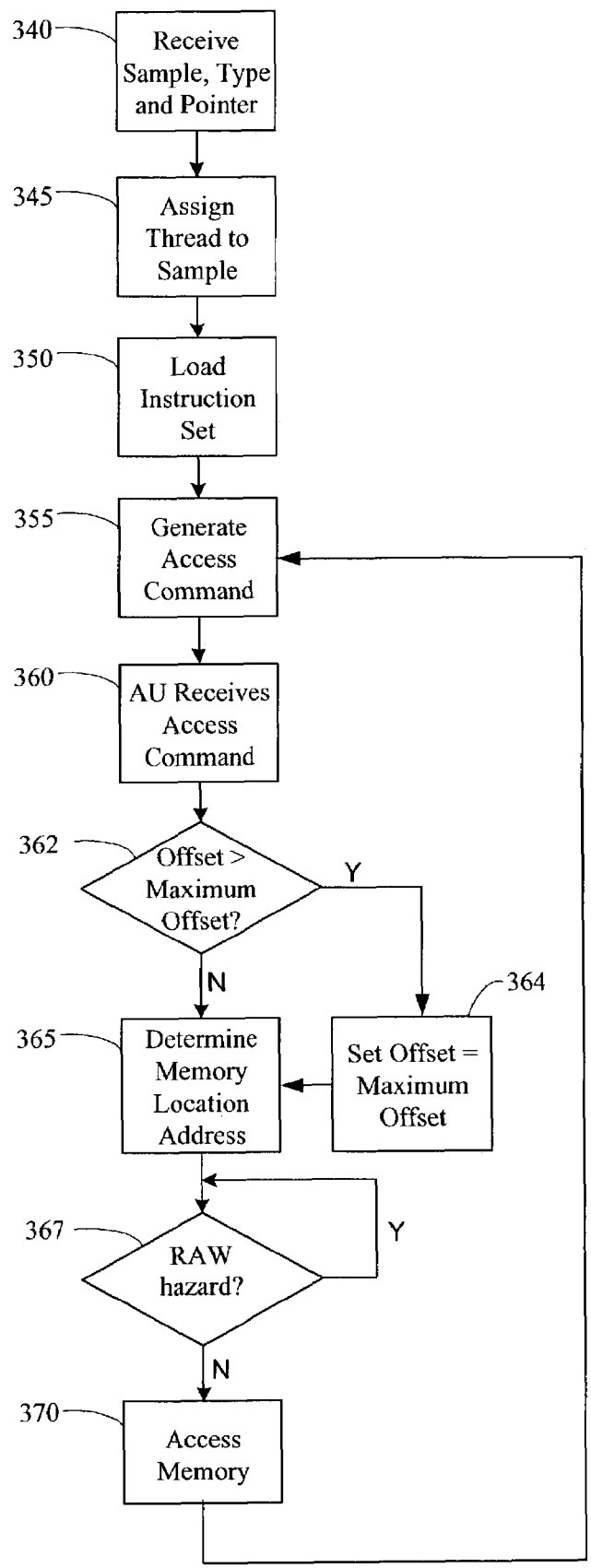
FIG. 3B shows a flowchart for accessing memory spaces that have been reserved for threads of a first set of threads using the flow shown in FIG. 3A.

FIG. 3B shows a flowchart of a method for accessing Memory Spaces 205 that have been reserved for threads of a first set of threads using the method shown in FIG. 3A. FIG. 3B is described in relation to FIGS. 1, 2, and 3A.

At step 340, a Functional Unit 140, 150, 160, or 170 receives a sample, a sample type identifier associated with the sample, and a pointer to an instruction set associated with the sample. An instruction set is a specific subset of program instructions of Graphics Application 111 (executing on Host CPU 114) used to process an associated sample. The pointer to the associated instruction set locates a memory address in a memory resource (e.g., Host Memory 112, Local Memory 135, LSR 145, 155, 165, 175, or the like) where the associated instruction set is found.

At step 345, TCB 127 assigns a thread to the sample received by Functional Unit 140, 150, 160, or 170, the thread being identified by a THD# 202. In an alternative embodiment, TCB 127 also assigns a stack pointer to the sample, the stack pointer being associated with the thread assigned to the sample and is used in accessing a memory space implemented as a stack.

At step 350, the thread assigned to the sample uses the received pointer to locate the instruction set associated with the sample and loads the instruction set to the Functional Unit 140, 150, 160, or 170 that received the sample. In an alternative embodiment, TCB 127 assigns a thread (identified by a THD# 202) and a base memory space address of the allocated Memory Space 205 to the sample.

At step 355, the thread processes the sample according to the instruction set associated with the sample, the instruction set executing on the Functional Unit 140, 150, 160, or 170 that received the sample. During the processing of the sample, the thread executes an instruction in the instruction set that generates an access command for a Memory Location 210 in a Memory Space 205 allocated to the thread (in steps 320 through 330). If Memory Space 205 allocated to the thread is implemented as a stack, the access command can also be referred to as a "push" or "pop" command. The allocated Memory Space 205 to be accessed is reserved for use by the thread to which it is allocated.

At step 360, an access command produced by the thread is received at AU 128. In an alternative embodiment, the stack pointer associated with the thread producing the access command is also received at AU 128. An access command includes an operation command and address request information. Address request information is used by AU 128 in determining a memory location address of a Memory Location 210 in the Memory Space 205 to be accessed. If the operation command is a write command, the access command also includes data to be written. If the Memory Space 205 to be accessed is implemented as a stack, the address request information includes the THD# 202 that identifies the thread producing the access command. If the Memory Space 205 to be accessed is implemented to support random access, the address request information includes the THD# 202 and a memory location offset provided by the instruction generating the access command. The memory location offset is used to locate a particular Memory Location 210 of the Memory Space 205 to be accessed.

In an alternative embodiment, clamping is performed at steps 362 and 364. To perform clamping, a maximum memory location offset of a Memory Space 205 is set to equal the memory space size of Memory Space 205 (determined at step 310) minus one. In the example shown in FIG. 2, the first memory space size is equal to (S1+1) and, therefore, the maximum memory location offset for Memory Space 205 is equal to S1.

At step 362, AU 128 determines if a memory location offset received at step 360 is greater than the maximum memory location offset of the Memory Space 205 to be accessed. If so, at step 364, the received memory location offset is set to equal the maximum memory location offset. Otherwise, the method proceeds to step 365.

The clamping function performed at steps 362 and 364 provides for error correction of illegal access commands, i.e., access commands containing memory location offsets that exceed the maximum memory location offset of a Memory Space 205 to be accessed. In a further embodiment, an error condition indicator is stored in AU 128 and is set if AU 128 determines (at step 362) that an illegal access command has been received. In yet a further embodiment, a received illegal access command (determined at step 362) is ignored if the received illegal access command is a write command and a value of 0 is returned if the received illegal access command is a read command.

At step 365, AU 128 uses the look-up table stored to AU 128 (at step 335) and the address request information received by AU 128 (at step 360) to determine a memory location address of a Memory Location 210 in the Memory Space 205 to be accessed by the access command (received at step 360). If the Memory Space 205 to be accessed is implemented as a stack, AU 128 uses THD# 202 contained in the address request information to determine the memory location address of Base Memory Space Location 215 (i.e., the base memory space address of Memory Space 205) from the look-up table. At step 365, if the Memory Space 205 to be accessed is implemented to support random access, AU 128 uses THD# 202 and the memory location offset contained in the address request information to determine the memory location address of the Memory Location 210 to be accessed from the look-up table. At step 367, the memory location address of the Memory Location 210 and the operation command is used by AU 128 to determine if a RAW hazard exists. If so, step 367 is repeated. Otherwise, the method proceeds to step 370. In a further embodiment, the operation command and address request information received by AU 128 is used to determine if a RAW hazard exists.

At step 370, the operation command contained in the access command (received at step 360) and the memory location address (determined at step 365) of the Memory Location 210 to be accessed by the access command is sent to Memory Controller 130. If the operation command is a write command, data to be written is also sent to Memory Controller 130. In an alternative embodiment, the stack pointer associated with the thread producing the access command is also sent to Memory Controller 130. Memory Controller 130 then accesses the Memory Location 210 in Memory Space 205 according to the operation command.

At step 355, the thread continues processing of the sample (received at step 340) according to the instruction set executing on the Functional Unit 140, 150, 160, or 170 that received the sample until the instruction set completes execution. While the thread is processing the received sample, the Memory Space 205 used by the thread is accessed only by that particular thread.

Figure 4A:
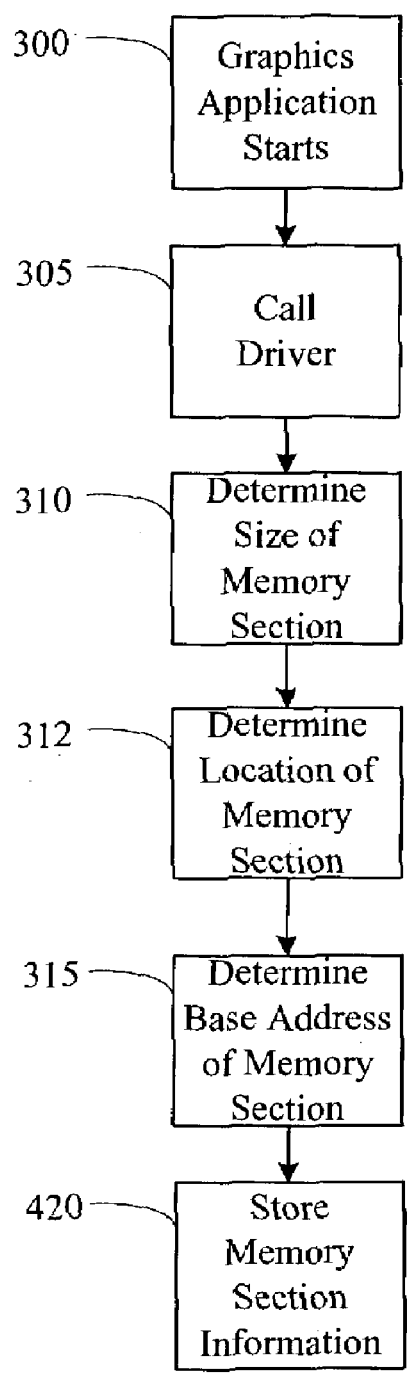
FIGS. 4A and 4B show flowcharts for managing memory spaces for use by threads of a first set of threads executing on a graphics processor.
Figure 4B:
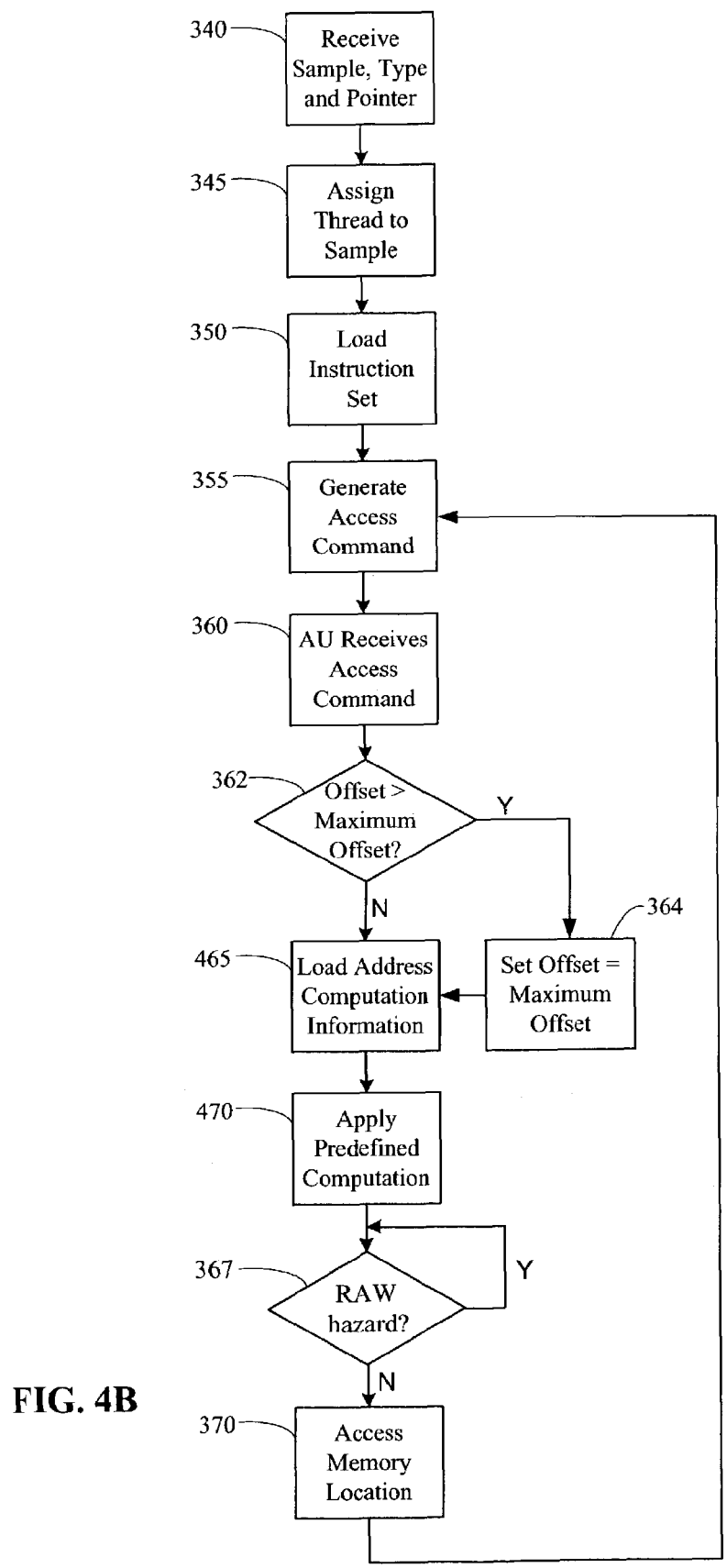

The method shown in the flowchart of FIG. 4B can be used to access a Memory Space 205 reserved for another thread in the first set of threads as well. The method of FIG. 4B repeats for each thread in the first set of threads that is assigned (at step 345) to a sample by TCB 127.

FIGS. 4A and 4B show flowcharts of a method for managing Memory Spaces 205 for use by threads of a first set of threads executing on Graphics Processor 125. FIG. 4A is described in relation to FIGS. 1, 2, and 3A. Steps 300 through 315 of FIG. 4A are substantially similar to steps 300 through 315 of FIG. 3A and are not described in further detail. At step 420, the memory section information for Memory Section 220 (i.e., the first memory space size of Memory Space 205 and the base memory section address of Memory Section 220) as determined in steps 310 and 315 is stored to AU 128.

FIG. 4B is described in relation to FIGS. 1, 2, 3A, and 4A. Steps 340 through 364 of FIG. 4B are substantially similar to steps 340 through 364 of FIG. 3B and are not described in further detail.

At step 465, memory location address computation information is loaded into the AU computational unit of AU 128. As used herein, memory location address computation information refers to information used by AU 128 to determine a memory location address of a Memory Location 210 in a Memory Space 205 to be accessed by an access command received at step 360. If the Memory Space 205 to be accessed is implemented as a stack, the memory location address computation information includes the memory section information for Memory Section 220 stored to AU 128 at step 420. The memory location address computation information also includes THD# 202 identifying the thread producing the access command, THD# 202 being contained in the address request information received at step 360. If the Memory Space 205 to be accessed is implemented to support random access, the memory location address computation information further includes a memory location offset, the memory location offset being contained in the address request information received at step 360.

At step 470, AU 128 applies a predefined computation to the memory location address computation information to determine a memory location address of a Memory Location 210 in a Memory Space 205 to be accessed. If the Memory Space 205 to be accessed is implemented as a stack, the memory location address of Base Memory Space Location 215 is determined using a first predefined computation. The first predefined computation may be a following predefined equation:

$$\text{base memory section address of Memory Section } 220 + (\text{THD\# } 202 * \text{first memory space size}).$$

If the Memory Space 205 to be accessed is implemented to support random access, any Memory Location 210 in Memory Space 205 can be accessed. The memory location address of a Memory Location 210 to be accessed is determined using a second predefined computation. The second predefined computation may be a following predefined equation:

$$\text{base memory section address of Memory Section } 220 + (\text{THD\# } 202 * \text{first memory space size}) + \text{memory location offset}.$$

For example, as shown in FIG. 2, a base memory space address of Memory Space 205 reserved for a thread having THD# 202 of 1 is determined by the sum of the base memory section address for Memory Section 220 (the memory location address of Base Memory Section Location 225) and 1 (THD# 202) multiplied by S1+1 (first memory space size). If Memory Section 220 is implemented to support random access, the memory location address of Example Memory Location 240 can be determined by the sum of the base memory space address of Memory Space 205 reserved for the thread having THD# 202 of 1 (as determined above) and a memory location offset (equal to 1) associated with Example Memory Location 240.

In an alternative embodiment, the first predefined computation is a following predefined order of concatenation:

{base memory section address for Memory Section 220, THD# 202, memory location offset of 0}.

In a further embodiment, the second predefined computation is a following predefined order of concatenation:

{base memory section address for Memory Section 220, THD# 202, memory location offset}.

At step 367, the memory location address of the Memory Location 210 and the operation command is used to determine if a RAW hazard exists. If so, step 367 is repeated. Otherwise, the method proceeds to step 370. In a further embodiment, the operation command and address request information is used to determine if a RAW hazard exists. In yet a further embodiment a thread identification number and memory location offset is used to determine if a RAW hazard exists.

At step 370, the operation command contained in the access command (received at step 360) and the memory location address (determined at step 470) of the Memory Location 210 to be accessed by the access command is sent to Memory Controller 130. If the operation command is a write command, data to be written is also sent to Memory Controller 130. In an alternative embodiment, the stack pointer associated with the thread producing the access command is also sent to Memory Controller 130. Memory Controller 130 then accesses the Memory Location 210 according to the operation command.

At step 355, the thread continues processing of the sample (received at step 340) according to the instruction set executing on the Functional Unit 140, 150, 160, or 170 that received the sample until the instruction set completes execution. While the thread is processing the received sample, the Memory Space 205 used by the thread is accessed only by that particular thread.

The method shown in the flowchart of FIG. 4B can be used to access a Memory Space 205 reserved for another thread in the first set of threads as well. The method of FIG. 4B repeats for each thread in the first set of threads that is assigned (at step 345) to a sample by TCB 127.

Figure 5:
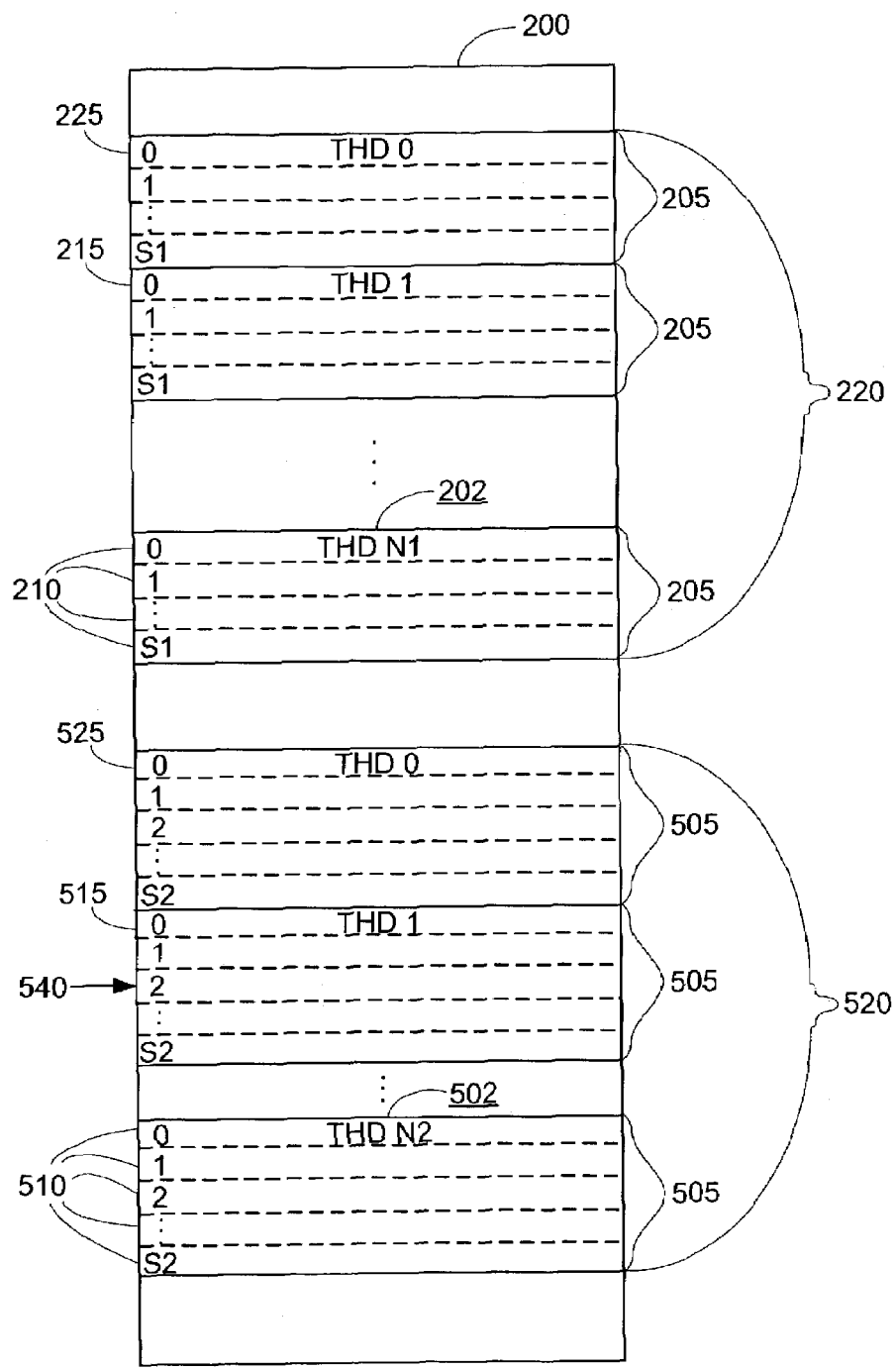
FIG. 5 is a block diagram of a memory resource containing memory spaces that are reserved, accessed, or managed according to another memory space reservation process.

FIG. 5 shows a conceptual diagram of a Memory Resource 200 containing memory spaces that are reserved or managed according to an alternative memory space reservation process. FIG. 5 is described in relation to FIGS. 1 and 2.

Memory Resource 200 of FIG. 5 contains each element shown in FIG. 2. Memory Resource 200 also contains a Second Memory Section 520 having at least two Memory Spaces 505 for use by threads of a second set of threads executing on Graphics Processor 125. All threads of the first set of threads are of a first thread type and are each reserved a Memory Space 205 having a first memory space size. All threads of the second set of threads are of a second thread type and are each reserved a Memory Space 505 having a second memory space size, the second thread type being different than the first thread type and the second memory space size not being equal to the first memory space size. In the example shown in FIG. 5, the first memory space size is equal to S1+1 and the second memory space size is equal to S2+1.

Each thread of the first set of threads is identified by an associated first thread type identifier and an associated THD# 202 and each thread of the second set of threads is identified by an associated second thread type identifier and an associated THD# 502. The THD# 202 of a thread in the first set of threads is an order number of the thread in the first set of threads and the THD# 502 of a thread in the second set of threads is an order number of the thread in the second set of threads. In the example shown in FIG. 5, the first set of threads includes N1+1 threads (having THD#s 202 ranging from 0 through N1) and the second set of threads includes N2+1 threads (having THD#s 502 ranging from 0 through N2). The number of threads (N1+1) in the first set of threads may be equal or not equal to the number of threads (N2+1) in the second set of threads.

A Memory Space 505 is reserved for each thread in the second set of threads. Each Memory Space 505 contains at least one Memory Location 510, each Memory Location 510 being identified by a unique memory location address. A first Memory Location 510 of Memory Space 505 is defined as a Base Memory Space Location 515, the Base Memory Space Location 515 having a unique memory location address (i.e., base memory space address of Memory Space 505).

Memory Spaces 505 reserved for threads of the second set of threads includes Second Memory Section 520. A first Memory Location 510 of Second Memory Section 520 is defined as a Base Memory Section Location 525, the Base Memory Section Location 525 having a unique memory location address, i.e., a base memory section address of Second Memory Section 520. A size of Second Memory Section 520 is equal to the sum of the memory space sizes of all Memory Spaces 505 allocated to threads of the second set of threads.

As described above, FIG. 3A shows a flowchart of a method for reserving Memory Spaces 205 for threads of a first set of threads executing on Graphics Processor 125. The method described in relation to FIG. 3A can also be used for reserving Memory Spaces 205 or 505 for threads in a first and second set of threads without substantial alteration. Only those steps that include additional elements or that differ from the steps described above in relation to FIG. 3A will be described in detail.

At step 305, Driver 113 executes in Host CPU 114 and contains information relating to Graphics Processor 125 including thread type identifiers identifying the type of threads Graphics Processor 125 is capable of executing, a number of threads of each thread type Graphics Processor 125 is capable of executing simultaneously, an amount of memory space used by each thread of each thread type, and a size of memory space available in graphics memory resources located on Graphics Processor 125.

At step 310, Driver 113 determines a size of Second Memory Section 520 in Memory Resource 200 to be reserved for a second group of threads that will execute on Graphics Processor 125. In the example shown in FIG. 5, the second set of threads includes N2+1 threads. Driver 113 determines a second memory space size of a Memory Space 505 to be reserved for each thread in the second set of threads, the memory space size being equal to or greater than the memory space amount used by each thread. In the example shown in FIG. 5, the second memory space size is S2+1. Driver 113 then multiplies the number of threads in the second set of threads with the second memory space size to determine the size of Second Memory Section 520 in Memory Resource 200.

At step 312, Driver 113 determines that Memory Section 220 and Second Memory Section 520 are to be contained in Memory Resource 200. If Memory Resource 200 is a graphics memory resource, at step 315, Driver 113 assigns a base memory section address for Second Memory Section 520. If Memory Resource 200 is Host Memory 112 or a peripheral memory resource (not shown) coupled to System Interface 115, Driver 113 receives, at step 315, a base memory section address for Second Memory Section 520 from Host CPU 114.

At step 320, Driver 113 allocates a Memory Space 505 to a thread in the second set of threads, starting with a thread having a THD# 502 of 0. If Second Memory Section 520 is implemented as a stack, Driver 113 identifies the base memory space address for Memory Space 505 allocated to a thread by applying the first predefined computation. If Second Memory Section 520 is implemented to support random access, Driver 113 identifies a memory location address for each Memory Location 510 in Memory Space 505 using the second predefined computation. The first and second predefined computations are applied using the base memory section address of Second Memory Section 520, an order number of the thread in the second set of threads (THD# 502), and the second memory space size of a Memory Space 505 allocated to a thread in the second set of threads.

For example, as shown in FIG. 5, a base memory space address of Memory Space 505 reserved for a thread having THD# 502 of 1 is determined by the sum of the base memory section address for Second Memory Section 520 and 1 (THD# 502) multiplied by S2+1 (second memory space size). If Second Memory Section 520 is implemented to support random access, the memory location address of Example Memory Location 540 can be determined by the sum of the base memory space address of Memory Space 505 reserved for the thread having THD# 502 of 1 (as determined above) and a memory location offset (equal to 2) associated with Example Memory Location 540.

At step 325, the base memory space address of Memory Space 205 allocated to a thread in the first set of threads, the THD# 202 of the thread, and a thread type identifier associated with the thread are added to a look-up table. Likewise, the base memory space address of Memory Space 505 allocated to a thread in the second set of threads, the THD# 502 of the thread, and a thread type identifier associated with the thread are added to the look-up table. After steps 320 through 330 are completed, a Memory Space 505 is allocated for each thread in the second set of threads and each Memory Space 505 is added to the look-up table. In the example shown in FIG. 5, N2+1 threads in the second set of threads are allocated a Memory Space 505, each Memory Space 505 being reserved for the thread to which it is allocated.

As described above, FIG. 3B shows a flowchart of a method for accessing Memory Spaces 205 that have been reserved for threads of a first set of threads using the method shown in FIG. 3A. The method described in relation to FIG. 3B can also be used for accessing Memory Spaces 205 or 505 that have been reserved for threads of a first and second set of threads without substantial alteration. Only those steps that include additional elements or that differ from the steps described above in relation to FIG. 3B will be described in detail.

At step 340, a Functional Unit 140, 150, 160, or 170 receives a sample, a sample type identifier associated with the sample, and a pointer to an instruction set associated with the sample. At step 345, TCB 127 assigns a thread to the sample based on the thread type identifier associated with the thread and the sample type identifier associated with the sample.

At step 360, an access command produced by a thread is received at AU 128 including an operation command and address request information. If the Memory Space 505 to be accessed is implemented as a stack, the address request information includes the thread type identifier associated with the thread and THD# 202 or 502 that identifies the thread producing the access command. If the Memory Space 205 or 505 to be accessed is implemented to support random access, the address request information also includes a memory location offset provided by the instruction generating the access command.

At step 365, AU 128 uses the look-up table and the received address request information to determine a memory location address of a Memory Location 210 or 510 in the Memory Space 205 or 505 to be accessed. If the Memory Space 205 or 505 to be accessed is implemented as a stack, AU 128 uses the thread type identifier and THD# 202 or 502 contained in the address request information to determine the memory location address of Base Memory Space Location 215 or 515 from the look-up table. If the Memory Space 205 or 505 to be accessed is implemented to support random access, AU 128 uses the thread type identifier, THD# 202 or 502, and the memory location offset contained in the address request information to determine the memory location address of the Memory Location 210 or 510 to be accessed from the look-up table.

As described above, FIGS. 4A and 4B show flowcharts of a method for managing Memory Spaces 505 for use by threads of a first set of threads executing on Graphics Processor 125. The method described in relation to FIGS. 4A and 4B can also be used for managing Memory Spaces 205 or 505 for use by threads of a first and second set of threads executing on Graphics Processor 125 without substantial alteration. Only those steps that include additional elements or that differ from the steps described above in relation to FIGS. 4A and 4B will be described in detail.

At step 420, the memory section information for Second Memory Section 520 (i.e., the second memory space size of a Memory Space 505 in Second Memory Section 520 and the base memory section address for Second Memory Section 520) is stored in AU 128.

At step 465, memory location address computation information is loaded into the AU computational unit of AU 128. If the thread type identifier contained in the address request information (received at step 360) is the first thread type identifier (indicating a thread of the first set of threads), the memory location address computation information includes the memory section information for Memory Section 220. If the thread type identifier contained in the address request information (received at step 360) is the second thread type identifier (indicating a thread of the second set of threads), the memory location address computation information includes the memory section information for Second Memory Section 520. The memory location address computation information also includes THD# 202 or 502 (contained in the address request information received at step 360). If the Memory Space 205 or 505 to be accessed is implemented to support random access, memory location address computation information further includes a memory location offset (contained in the address request information received at step 360).

At step 470, AU 128 applies a predefined computation to the memory location address computation information loaded onto the AU computational unit (at step 465) to determine a memory location address of a Memory Location 210 or 510 in a Memory Space 205 or 505 to be accessed. If the Memory Space 205 or 505 to be accessed is implemented as a stack, AU 128 applies the first predefined computation using the memory location address computation information to determine the memory location address of Base Memory Space Location 215 or 515 (i.e., the base memory space address for Memory Space 205 or 505). If the Memory Space 205 or 505 to be accessed is implemented to support random access, AU 128 applies the second predefined computation using the memory location address computation information to determine the memory location address of the Memory Location 210 or 510 to be accessed.

Figure 6:
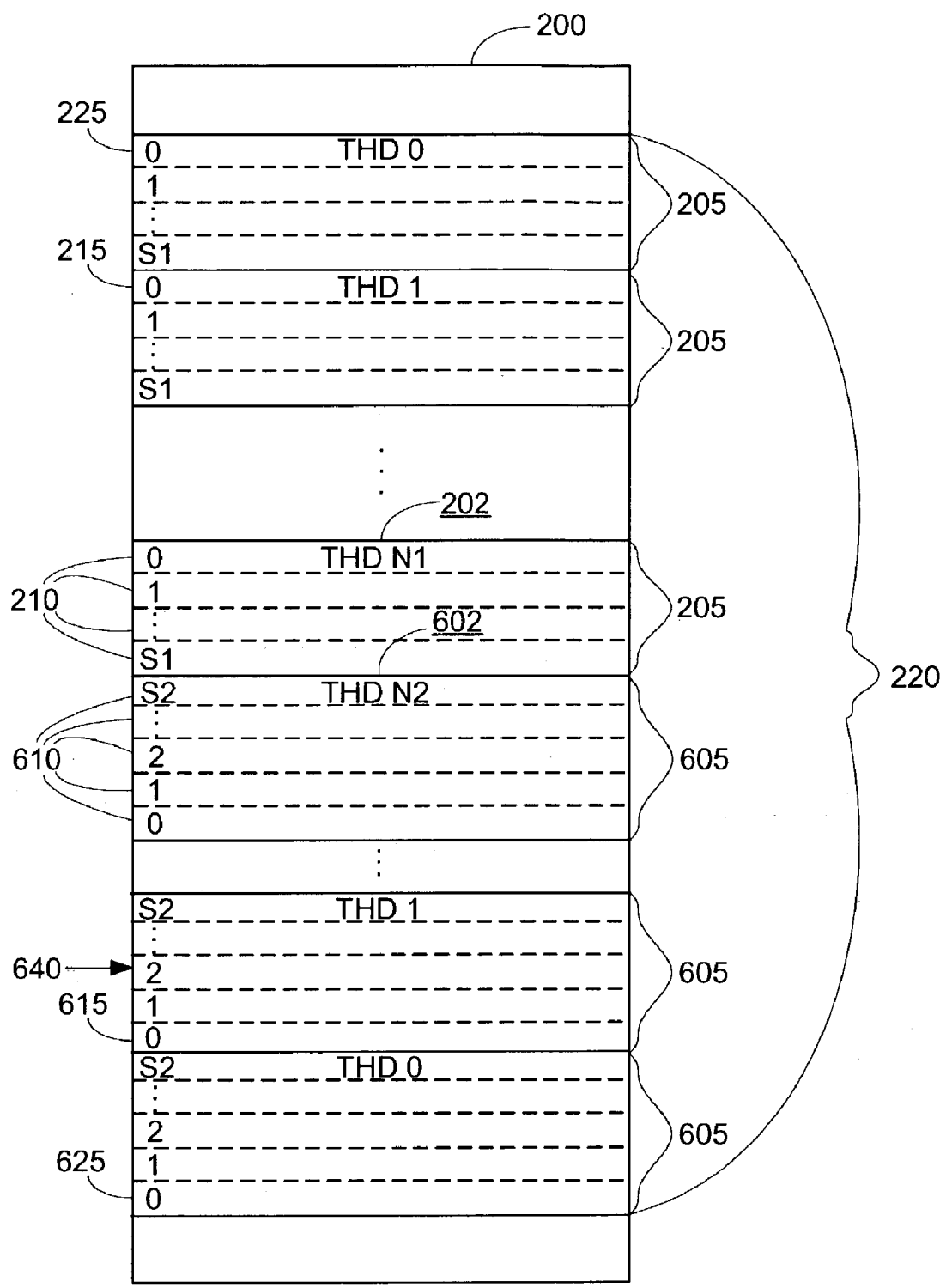
FIG. 6 is a block diagram of a memory resource containing memory spaces that are reserved, accessed, or managed according to a first alternative memory space reservation process to that of FIG. 5.

FIG. 6 shows a conceptual diagram of a Memory Resource 200 containing memory spaces that are reserved or managed according to a further alternative memory space reservation process. FIG. 6 is described in relation to FIGS. 1 and 2.

Memory Resource 200 of FIG. 6 contains each element shown in FIG. 2. Memory Section 220 contains Memory Spaces 205 or 605 allocated to threads of a first set of threads. The first set of threads includes a first thread group and a second thread group. All threads of the first thread group are of a first thread type and are each reserved a Memory Space 205 having a first memory space size. All threads of the second thread group are of a second thread type and are each reserved a Memory Space 605 having a second memory space size, the second thread type being different than the first thread type and the second memory space size not being equal to the first memory space size. In the example shown in FIG. 6, the first memory space size is equal to S1+1 and the second memory space size is equal to S2+1.

Each thread of the first thread group is identified by an associated first thread type identifier and an associated THD# 202 and each thread of the second thread group is identified by an associated second thread type identifier and an associated THD# 602. The THD# 202 of a thread in the first thread group is an order number of the thread in the first thread group and the THD# 602 of a thread in the second thread group is an order number of the thread in the second thread group. In the example shown in FIG. 6, the first thread group includes N1+1 threads (having THD#s 202 ranging from 0 through N1) and the second thread group includes N2+1 threads (having THD#s 602 ranging from 0 through N2). The number of threads (N1+1) in the first thread group may be equal or not equal to the number of threads (N2+1) in the second thread group.

A Memory Space 605 is reserved for each thread in the second thread group. Each Memory Space 605 contains at least one Memory Location 610, each Memory Location 610 being identified by a unique memory location address. A first Memory Location 610 of Memory Space 605 is defined as a Base Memory Space Location 615, the Base Memory Space Location 615 having a unique memory location address (i.e., base memory space address of Memory Space 605).

Memory Spaces 205 reserved for threads of the first and second thread group includes Memory Section 220. A last Memory Location 610 of Memory Section 220 is defined as an End Memory Section Location 625, the End Memory Section Location 625 having a unique memory location address, i.e., an end memory section address of Memory Section 220. A size of Memory Section 620 is equal to the sum of the memory space sizes of all Memory Spaces 205 and 605 allocated to threads of the first and second thread group.

As described above, FIG. 3A shows a flowchart of a method for reserving Memory Spaces 205 for threads of a first set of threads executing on Graphics Processor 125. The method described in relation to FIG. 3A can also be used for reserving Memory Spaces 205 or 605 for threads in a first and second thread group, the first and second thread group including the first set of threads, without substantial alteration. Only those steps that include additional elements or that differ from the steps described above in relation to FIG. 3A will be described in detail.

At step 305, Driver 113 executes in Host CPU 114 and contains information relating to Graphics Processor 125 including thread type identifiers identifying the type of threads Graphics Processor 125 is capable of executing, a number of threads of each thread type Graphics Processor 125 is capable of executing simultaneously, an amount of memory space used by each thread of each thread type, and a size of memory space available in graphics memory resources located on Graphics Processor 125.

At step 310, Driver 113 determines a size of a Memory Section 220 in Memory Resource 200 to be reserved for a first and second group of threads (including the first set of threads) that will execute on Graphics Processor 125. To do so, Driver 113 determines a number of threads in the first thread group and a number of threads in the second thread group. In the example shown in FIG. 6, the first thread group includes N1+1 threads and the second thread group includes N2+1 threads. Driver 113 determines a first memory space size of a Memory Space 205 to be reserved for each thread in the first thread group and a second memory space size of a Memory Space 605 to be reserved for each thread in the second thread group, the memory space size being equal to or greater than the memory space amount used by each thread. In the example shown in FIG. 6, the first memory space size is S1+1 and the second memory space size is S2+1. Driver 113 then computes the sum of the number of threads in the first thread group multiplied by the first memory space size and the number of threads in the second thread group multiplied by the second memory space size to determine the size of Memory Section 220 in Memory Resource 200.

At step 312, Driver 113 determines which Memory Resource 200 is to contain Memory Section 220 and assigns or receives a base memory section address for Memory Section 220. Driver 113 then determines an end memory section address of Memory Section 220 using the base memory section address of Memory Section 220 and the size of Memory Section 220 (determined at step 310). As used herein, the memory section information for Memory Section 220 refers to the first memory space size of a Memory Space 205 in Memory Section 220, the second memory space size of a Memory Space 605 in Memory Section 220, the base memory section address of Memory Section 220, and the end memory section address of Memory Section 220.

At step 320, Driver 113 allocates a Memory Space 605 to a thread in the second thread group, starting with a thread having a THD# 602 of 0. If Memory Section 220 is implemented as a stack, Driver 113 identifies the base memory space address for Memory Space 605 allocated to a thread by applying a third predefined computation. The third predefined computation may be a following predefined equation:

end memory section address of Memory Section 220−(THD# 602*second memory space size).

If Memory Section 220 is implemented to support random access, Driver 113 identifies a memory location address for each Memory Location 610 in Memory Space 605 using a fourth predefined computation. The fourth predefined computation may be a following predefined equation:

end memory section address of Memory Section 220−(THD# 602*second memory space size)−memory location offset.

For example, as shown in FIG. 6, an end memory space address of Memory Space 605 reserved for a thread having THD# 602 of 1 is determined by the end memory section address for Memory Section 220 minus 1 (THD# 602) multiplied by S2+1 (second memory space size). If Memory Section 220 is implemented to support random access, the memory location address of Example Memory Location 640 can be determined by the base memory space address of Memory Space 605 reserved for the thread having THD# 602 of 1 (as determined above) minus a memory location offset (equal to 2) associated with Example Memory Location 640.

At step 325, the base memory space address of Memory Space 205 allocated to a thread in the first thread group, the THD# 202 of the thread, and a thread type identifier associated with the thread are added to a look-up table. Likewise, the base memory space address of Memory Space 605 allocated to a thread in the second thread group, the THD# 602 of the thread, and a thread type identifier associated with the thread are added to the look-up table. After steps 320 through 330 are completed, a Memory Space 205 or 605 is allocated for each thread in the first and second thread groups and each Memory Space 205 or 605 is added to the look-up table.

As described above, FIG. 3B shows a flowchart of a method for accessing Memory Spaces 205 that have been reserved for threads of a first set of threads using the method shown in FIG. 3A. The method described in relation to FIG. 3B can also be used for accessing Memory Spaces 205 or 605 that have been reserved for threads of a first and second thread group (including the first set of threads) without substantial alteration. Only those steps that include additional elements or that differ from the steps described above in relation to FIG. 3B will be described in detail.

At step 340, a Functional Unit 140, 150, 160, or 170 receives a sample, a sample type identifier associated with the sample, and a pointer to an instruction set associated with the sample. At step 345, TCB 127 assigns a thread to the sample based on the thread type identifier associated with the thread and the sample type identifier associated with the sample.

At step 360, an access command produced by a thread is received at AU 128 including an operation command and address request information. If the Memory Space 205 or 605 to be accessed is implemented as a stack, the address request information includes the thread type identifier associated with the thread and THD# 202 or 602 that identifies the thread producing the access command. If the Memory Space 205 or 605 to be accessed is implemented to support random access, the address request information also includes a memory location offset provided by the instruction generating the access command.

At step 365, AU 128 uses the look-up table and the received address request information to determine a memory location address of a Memory Location 210 or 610 in the Memory Space 205 or 605 to be accessed. If the Memory Space 205 or 605 is implemented as a stack, AU 128 uses the thread type identifier and THD# 202 or 602 contained in the address request information to determine the memory location address of Base Memory Space Location 215 or 615 from the look-up table. If the Memory Space 205 or 605 to be accessed is implemented to support random access, AU 128 uses the thread type identifier, THD# 202 or 602, and the memory location offset contained in the address request information to determine the memory location address of the Memory Location 210 or 610 to be accessed from the look-up table.

As described above, FIGS. 4A and 4B show flowcharts of a method for managing Memory Spaces 605 for use by threads of a first set of threads executing on Graphics Processor 125. The method described in relation to FIGS. 4A and 4B can also be used for managing Memory Spaces 205 or 605 for use by threads of a first and second thread group (including the first set of threads) executing on Graphics Processor 125 without substantial alteration. Only those steps that include additional elements or that differ from the steps described above in relation to FIGS. 4A and 4B will be described in detail.

At step 420, the memory section information for Memory Section 220 (i.e., the first memory space size of Memory Space 205, the second memory space size of Memory Space 605, the base memory section address, and the end memory section address) is stored to AU 128.

At step 465, memory location address computation information is loaded into the AU computational unit of AU 128. If the thread type identifier contained in the address request information (received at step 360) is the first thread type identifier (indicating a thread of the first thread group), the memory location address computation information includes the first memory space size of Memory Space 205 and the base memory section address of Memory Section 220. If the thread type identifier contained in the address request information (received at step 360) is the second thread type identifier (indicating a thread of the second thread group), the memory location address computation information includes the second memory space size of Memory Space 605 and the end memory section address of Memory Section 220. The memory location address computation information also includes THD# 202 or 602 (contained in the address request information received at step 360). If the Memory Space 205 or 605 to be accessed is implemented to support random access, memory location address computation information further includes a memory location offset (contained in the address request information received at step 360).

At step 470, AU 128 applies a predefined computation to the memory location address computation information loaded onto the AU computational unit (at step 465) to determine a memory location address of a Memory Location 210 or 610 in a Memory Space 205 or 605 to be accessed. If the Memory Space 205 or 605 to be accessed is implemented as a stack, the memory location address of Base Memory Space Location 215 or 615 is to be determined. If the thread type identifier contained in the address request information (received at step 360) is the first thread type identifier (indicating a thread of the first thread group), AU 128 applies the first predefined computation using the memory location address computation information to determine the memory location address of Base Memory Space Location 215 (i.e., the base memory space address for Memory Space 205). If the thread type identifier contained in the address request information (received at step 360) is the second thread type identifier (indicating a thread of the second thread group), AU 128 applies the third predefined computation using the memory location address computation information to determine the memory location address of Base Memory Space Location 615 (i.e., the base memory space address for Memory Space 605).

At step 470, if the Memory Space 205 or 605 to be accessed is implemented to support random access, any Memory Location 210 or 610 in Memory Space 205 or 605 can be accessed. If the thread type identifier contained in the address request information (received at step 360) is the first thread type identifier (indicating a thread of the first thread group), AU 128 applies the second predefined computation using the memory location address computation information to determine the memory location address of Memory Location 210 to be accessed. If the thread type identifier contained in the address request information (received at step 360) is the second thread type identifier (indicating a thread of the second thread group), AU 128 applies the fourth predefined computation using the memory location address computation information to determine the memory location address of Memory Location 610 to be accessed.

Figure 7:
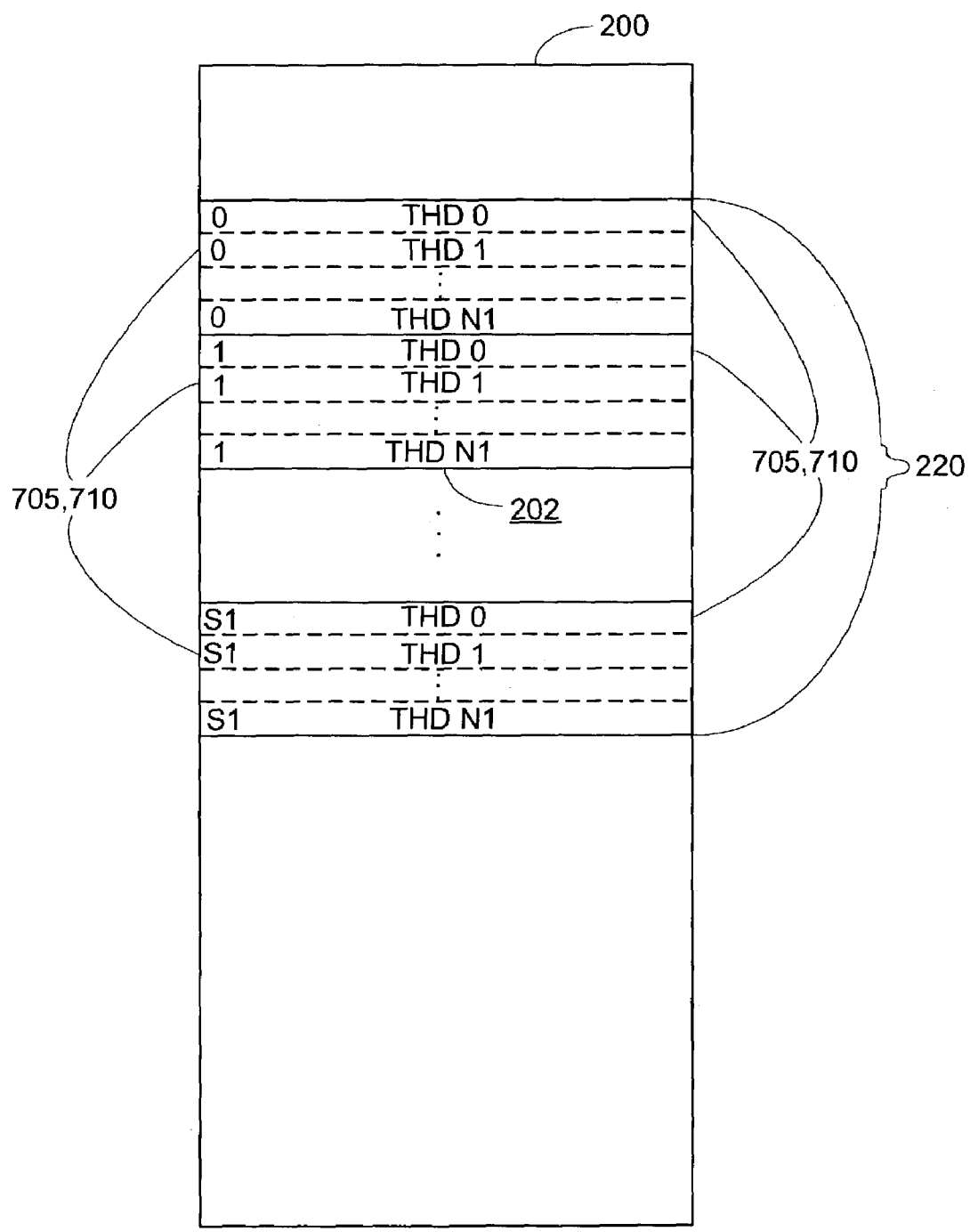
FIG. 7 is a block diagram of a memory resource containing memory spaces that are reserved, accessed, or managed according to a second alternative memory space reservation process to that of FIG. 5.

FIG. 7 shows a conceptual diagram of a Memory Resource 200 containing memory spaces that are reserved or managed according to a yet a further alternative method of the invention. FIG. 7 is described in relation to FIGS. 1 and 2.

FIG. 7 shows Memory Locations 210 of a Memory Space 205 allocated to a thread of the first set of threads interleaved with Memory Locations 210 of at least one other Memory Space 205 allocated to another thread of the first set of threads to form Interleaved Memory Spaces 705 containing Interleaved Memory Locations 710. In the example shown in FIG. 7, S1+1 Memory Locations 210 of N1+1 Memory Spaces 205 are interleaved forming N1+1 Interleaved Memory Spaces 705 each containing S1+1 Interleaved Memory Locations 710. Interleaving the memory spaces for a set of threads can result in lower latency for memory requests for threads accessing neighboring memory locations. In one embodiment, when memory location 0 for THD# 0 is read by AU 128 from Local Memory 135 or Host Memory 112, additional memory locations, such as memory location 0 for THD#1 and THD#2 are read and stored in Cache 129. When the threads are being processed simultaneously, memory location 0 for THD#1 and THD#2 can be received from Cache 129 instead of from Local Memory 135 or Host Memory 112.

As described above, FIG. 3A shows a flowchart of a method for reserving Memory Spaces 205 for threads of a first set of threads executing on Graphics Processor 125. The method described in relation to FIG. 3A can also be used for reserving Interleaved Memory Spaces 705 for threads of a first set of threads without substantial alteration. Only those steps that include additional elements or that differ from the steps described above in relation to FIG. 3A will be described in detail.

At step 320, Driver 113 allocates an Interleaved Memory Space 705 to a thread in the first set of threads, starting with a thread having a THD# 202 of 0. Driver 113 identifies a memory location address for each Interleaved Memory Location 710 in Interleaved Memory Space 705 using a third predefined computation. The third predefined computation may be a following predefined equation:

base memory section address of Memory Section 220+(memory location offset*first memory space size)+THD# 202.

In an alternative embodiment, the third predefined computation is a following predefined order of concatenation that may be used to access data stored in a conventional multi-dimensional array:

{base memory section address for Memory Section 220, memory location offset, THD# 202}.

At step 325, the THD# 202 of the thread allocated Interleaved Memory Space 705 (at step 320), a memory location offset associated with each Interleaved Memory Location 710 in the allocated Interleaved Memory Space 705, and a memory location address for each Interleaved Memory Location 710 are added to a look-up table.

As described above, FIG. 3B shows a flowchart of a method for accessing Memory Spaces 205 that have been reserved for threads of a first set of threads using the method shown in FIG. 3A. The method described in relation to FIG. 3B can also be used for accessing Interleaved Memory Spaces 705 that have been reserved for threads of a first set of threads without substantial alteration. Only those steps that include additional elements or that differ from the steps described above in relation to FIG. 3B will be described in detail.

At step 360, an access command produced by the thread is received at AU 128 containing address request information. The address request information includes the THD# 202 that identifies the thread producing the access command and a memory location offset provided by the instruction generating the access command.

As described above, FIGS. 4A and 4B show flowcharts of a method for managing Memory Spaces 505 for use by threads of a first set of threads executing on Graphics Processor 125. The method described in relation to FIGS. 4A and 4B can also be used for managing Interleaved Memory Spaces 705 for use by threads of a first set of threads executing on Graphics Processor 125 without substantial alteration. Only those steps that include additional elements or that differ from the steps described above in relation to FIGS. 4A and 4B will be described in detail.

At step 465, memory location address computation information is loaded into the AU computational unit of AU 128. The memory location address computation information includes the memory section information for Memory Section 220, THD# 202 identifying the thread producing the access command, and a memory location offset. At step 470, AU 128 applies the third predefined computation to the memory location address computation information to determine a memory location address of an Interleaved Memory Location 710 in an Interleaved Memory Space 705 to be accessed.

Figure 8:
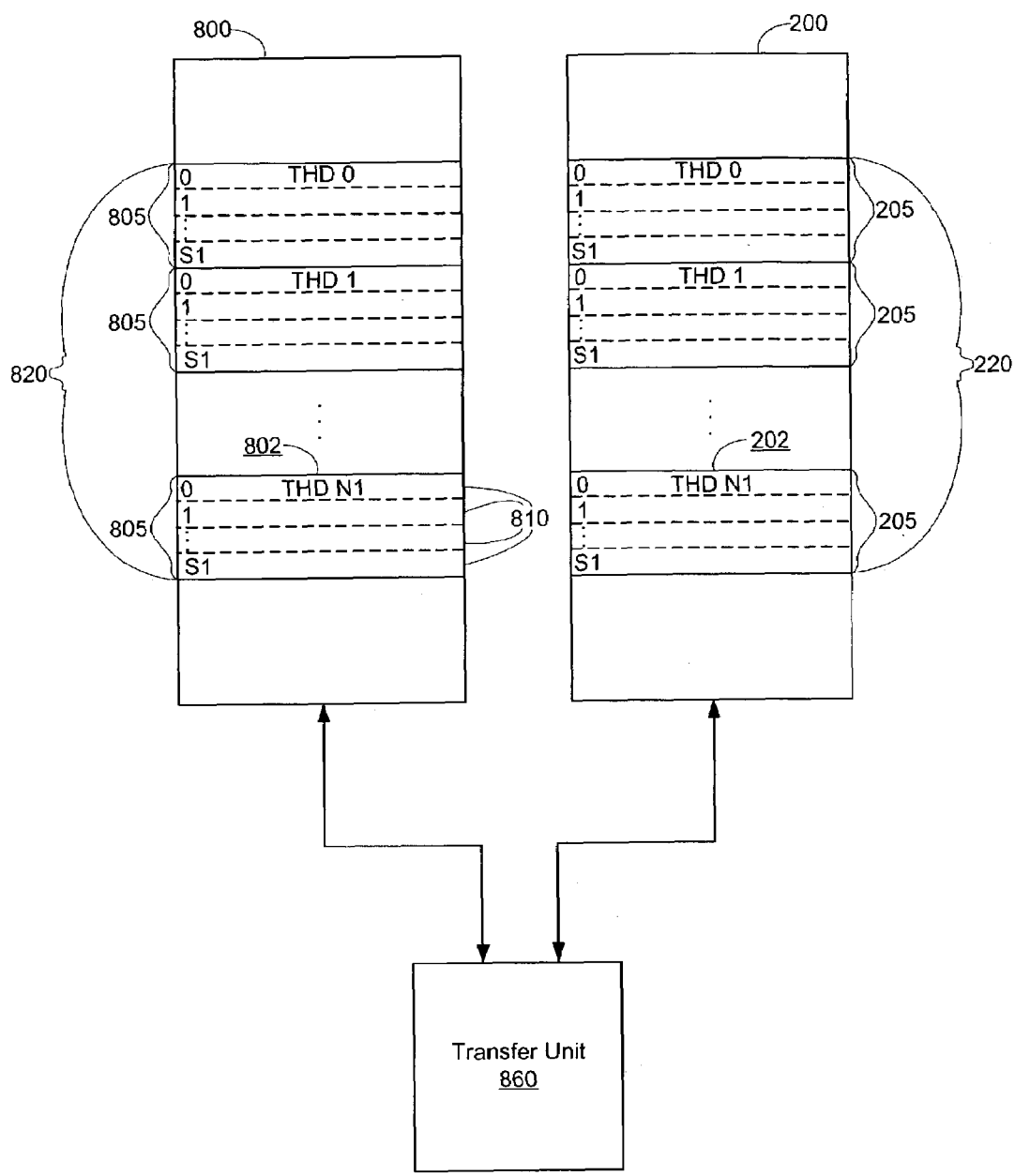
FIG. 8 is a block diagram of a memory resource for storing thread data from a primary memory resource.

FIG. 8 shows a conceptual diagram of a Memory Resource 200 for storing thread data from a Primary Memory Resource 800. FIG. 8 is described in relation to FIGS. 1 and 2.

Primary Memory Resource 800 can be Host Memory 112, a peripheral memory resource (not shown) coupled to System Interface 115 (e.g., hard disk drive, Zip drive, tape drive, CD-R, CD-RW, etc.), a graphics memory resource (such as Local Memory 135 or LSR 145, 155, 165, or 175), or any combination of the above. Primary Memory Resource 800 stores thread data generated by at least one thread of the first set of threads executing on Graphics Processor 125. As shown in FIG. 8, Memory Resource 200 may be used to store overflow thread data (spillage) from Primary Memory Resource 800. Primary Memory Resource 800 may or may not be located on the same physical device as Memory Resource 200. Primary Memory Resource 800 may be implemented as a stack or to support random access.

In one embodiment, as shown in the example of FIG. 8, Primary Memory Resource 800 contains a Primary Memory Space 805 for each thread in the first set of threads that is allocated, accessed, or managed (as described in FIGS. 3A, 3B, 4A, and 4B). As such, each thread in the first set of threads is identified by a THD# 802 and has a reserved Primary Memory Space 805 (having a base memory space address) in a Primary Memory Section 820 (having a base memory section address). Each Primary Memory Space 805 has at least one Primary Memory Location 810 and a memory space size equal to the number of Primary Memory Locations 810 contained in Primary Memory Space 805.

In an alternative embodiment, Primary Memory Resource 800 contains a Primary Memory Space 805 to store thread data generated by one thread of the first set of threads. In a further embodiment, there is a Primary Memory Resource 800 for each thread in the first set of threads, each Primary Memory Resource 800 containing a Primary Memory Space 805 for use by the thread and being coupled to Memory Resource 200 and Transfer Unit 860. In the further embodiment, all Primary Memory Resources 800 may be located on the same physical device or each Primary Memory Resource 800 may be located on a different physical device. In yet a further embodiment, Primary Memory Resource 800 contains a memory space containing thread data generated by any thread in the first set of threads using any storage structure or method.

Thread data transfers between Primary Memory Resource 800 and Memory Resource 200 are controlled by Transfer Unit 860 coupled to Primary Memory Resource 800 and Memory Resource 200. Transfer Unit 860 monitors thread data levels in a Primary Memory Space 805 of Primary Memory Resource 800 and performs thread data transfers between a Primary Memory Space 805 of Primary Memory Resource 800 and a Memory Space 205 of Memory Resource 200. Transfer Unit 860 can be internal to Graphics Processor 125 or external to Graphics Processor 125. If more than one Primary Memory Resource 800 is used, a separate Transfer Unit 860 may be implemented for each Primary Memory Resource 800 or one Transfer Unit 860 may be implemented for all Primary Memory Resources 800.

When Transfer Unit 860 determines that the thread data level in a Primary Memory Space 805 of Primary Memory Resource 800 reaches a first predetermined threshold, Transfer Unit 860 reads a first predetermined amount of thread data from the Primary Memory Space 805 and stores the first predetermined amount of thread data to a Memory Space 205 of Memory Resource 200. When Transfer Unit 860 determines that the thread data level in a Primary Memory Space 805 of Primary Memory Resource 800 reaches a second predetermined threshold, Transfer Unit 860 reads a second predetermined amount of thread data from a Memory Space 205 of Memory Resource 200 and stores the second predetermined amount of thread data to a Primary Memory Space 805 of Primary Memory Resource 800. Transfer Unit 860 can be hard-wired to perform the monitoring and transferring functions described above or be configured by a computer program product having a computer readable medium that includes computer program instructions to perform the monitoring and transferring functions.

Figure 9:
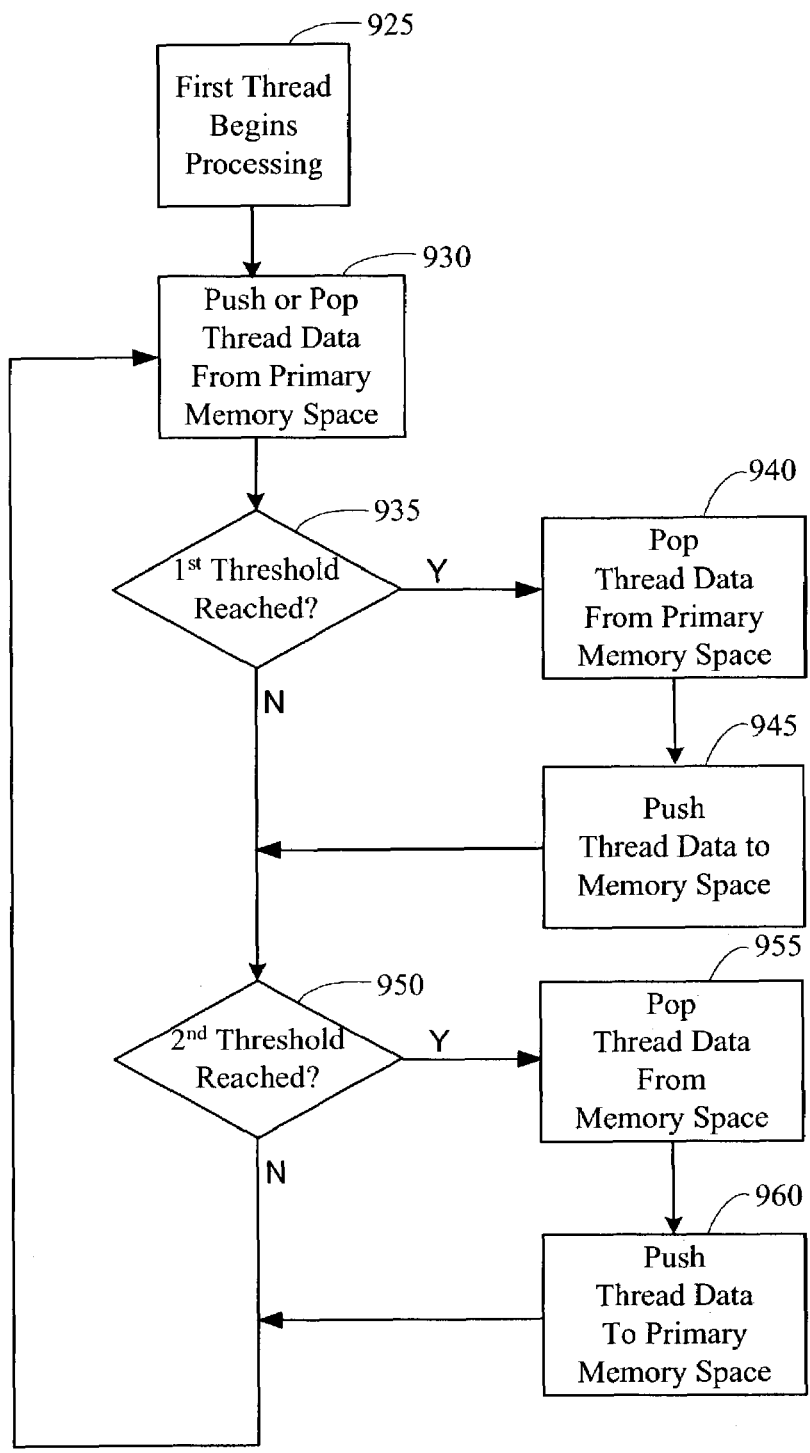
FIG. 9 shows a flowchart for transferring data between a primary memory space of a primary memory resource (shown in FIG. 8) and a memory space of a memory resource.

FIG. 9 shows a flowchart of a method for transferring data between a Primary Memory Space 805 of Primary Memory Resource 800 (shown in FIG. 8) and a Memory Space 205 of Memory Resource 200. FIG. 9 is described in relation to FIGS. 1 and 8.

The flowchart shown in FIG. 9 assumes that a first Primary Memory Space 805 of Primary Memory Resource 800 is implemented as a stack, is reserved for a first thread in a first set of threads, and is allocated, accessed, or managed in accordance with (as described in FIGS. 3A, 3B, 4A, and 4B) with modifications as described below. The flowchart shown in FIG. 9 also assumes that a first Memory Space 205 of Memory Resource 200 is implemented as a stack, is reserved for the first thread in the first set of threads, and is allocated or managed (as described in FIGS. 3A and 4A) with modifications as described below.

At step 925, a Functional Unit 140, 150, 160, or 170 of Graphics Processor 125 receives a sample, a sample type identifier associated with the sample, and a pointer to an instruction set associated with the sample. TCB 127 assigns a first thread in a first set of threads executing on Graphics Processor 125 to the sample, the first thread being identified by a THD# 202 and 802. TCB 127 also assigns a stack pointer to the sample, the stack pointer being associated with the thread assigned to the sample. The first thread uses the received pointer to locate the instruction set associated with the sample and loads the instruction set to the Functional Unit 140, 150, 160, or 170 that received the sample. The first thread processes the sample according to the instruction set, the instruction set executing on the Functional Unit 140, 150, 160, or 170 that received the sample.

At step 930, during the processing of the sample, the first thread produces thread data to be stored ("pushed") to a first Primary Memory Space 805 reserved for use by the first thread, first Primary Memory Space 805 being located in a Primary Memory Resource 800. During the processing of the sample, the first thread also reads ("pops") thread data from first Primary Memory Space 805. Thread data is stored to or read from first Primary Memory Space 805 starting from a base Primary Memory Location 810 of first Primary Memory Space 805 (i.e., thread data is "pushed" or "popped" from a "top" of first Primary Memory Space 805). As such, the first thread accesses the "top" of first Primary Memory Space 805 during processing of the received sample.

At step 935, Transfer Unit 860 determines if a thread data level in first Primary Memory Space 805 has reached a first predetermined threshold. If so, at step 940, Transfer Unit 860 reads a first predetermined amount of thread data from first Primary Memory Space 805. At step 940, thread data is read from a Primary Memory Location 810 of first Primary Memory Space 805 containing a last thread data stored in first Primary Memory Space 805 (i.e., thread data is "popped" from a "bottom" of first Primary Memory Space 805).

At step 945, Transfer Unit 860 stores the first predetermined amount of thread data from first Primary Memory Space 805 to a first Memory Space 205 reserved for use by the first thread, first Memory Space 205 being located in a Memory Section 220 of Memory Resource 200. Thread data is stored to first Memory Space 205 starting from a base Memory Location 210 of first Memory Space 205 (i.e., thread data is "pushed" to a "top" of first Memory Space 205). To push thread data to the top of first Memory Space 205, Transfer Unit 860 determines a base memory space address of first Memory Space 205 by using a look-up table (as described in relation to FIG. 3A) or a first predefined computation (as described in relation to FIG. 4B). The method then proceeds to step 950.

In step 935, if Transfer Unit 860 determines that the thread data level in first Primary Memory Space 805 has not reached a first predetermined threshold, the method proceeds to step 950. At step 950, Transfer Unit 860 determines if the thread data level in first Primary Memory Space 805 has reached a second predetermined threshold. If so, at step 955, Transfer Unit 860 reads a second predetermined amount of thread data from first Memory Space 205. At step 955, thread data is popped from the top of first Memory Space 205. To pop thread data from the top of first Memory Space 205, Transfer Unit 860 determines a base memory space address of first Memory Space 205 by using a look-up table (as described in relation to FIG. 3A) or a first predefined computation (as described in relation to FIG. 4B).

At step 960, Transfer Unit 860 stores the second predetermined amount of thread data from first Memory Space 205 to first Primary Memory Space 805. At step 960, thread data is stored to a first available Primary Memory Location 810 of first Primary Memory Space 805 ready to store thread data (i.e., thread data is "pushed" to the "bottom" of first Primary Memory Space 805). The method then proceeds to step 930.

In step 950, if Transfer Unit 860 determines that the thread data level in first Primary Memory Space 805 has not reached a second predetermined threshold, the method proceeds to step 930. At step 930, the thread continues processing of the sample while storing or reading thread data from first Primary Memory Space 805 according to the instruction set associated with the sample until the instruction set completes execution.

In the method shown in FIG. 9, note that a thread accesses (at step 930) the top of Primary Memory Space 805 during processing of the received sample and Transfer Unit 860 pushes (at step 960) thread data to the bottom of Primary Memory Space 805 from Memory Space 205. As such, transfer latency from Memory Space 205 to Primary Memory Space 805 can be hidden as long as there is enough thread data in Primary Memory Space 805 for a thread to access without waiting for transfer of thread data from Memory Space 205 to Primary Memory Space 805. The second predetermined threshold (which determines the thread data level of Primary Memory Space 805 when thread data is transferred from Memory Space 205 to Primary Memory Space 805) can be adjusted to achieve minimum transfer latency. Therefore, access time of a thread to Primary Memory Space 805 alone would be the same or substantial similar to the access time of a thread to Primary Memory Space 805 being supplemented by a spillage memory space (Memory Space 205).

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A method for allocation of a memory resource for a plurality of threads simultaneously executable in a graphics processor, comprising:

determining a first set of threads, each of a first thread type, from said plurality of threads simultaneously executable in said graphics processor, and a second set of threads, each of a second thread type, from said plurality of threads simultaneously executable in said graphics processor;

determining a first contiguous memory section to be allocated for said first set of threads, and allocating a memory space in said first contiguous memory section to each thread in said first set of threads; and determining a second contiguous memory section to be allocated for said second set of threads, and allocating a memory space in said second contiguous memory section to each thread in said second set of threads, wherein a memory space allocated to a particular thread in said first set of threads comprises two or more memory locations that are interleaved with two or more memory locations corresponding to memory spaces allocated to other threads in said first set of threads.

2. The method of claim 1, wherein a size of each memory space in said first contiguous memory section is equal to or greater than an amount needed by each thread in said first set of threads, and a size of each memory space in said second contiguous memory section is equal to or greater than an amount needed by each thread in said second set of threads.

3. The method of claim 1, wherein sizes of memory spaces in said first contiguous memory section are equal, and sizes of memory spaces in said second contiguous memory section are equal.

4. The method of claim 3, wherein a base memory space of said first contiguous memory section has a base memory section address and is allocated to a first thread in said first set of threads, and a base memory space of said second contiguous memory section has a base memory section address and is allocated to a first thread in said second set of threads.

5. The method of claim 1, wherein:

each thread in said first set of threads is allocated a memory space having a first memory space size; and each thread in said second set of threads is allocated a memory space having a second memory space size.

6. The method of claim 5, wherein:

a base memory space address of a memory space allocated to a particular thread in said first set of threads is identifiable by a base memory section address of said first contiguous memory section, an order number of said particular thread in said first set of threads, and said first memory space size; and a base memory space address of a memory space allocated to a particular thread in said second set of threads is identifiable by a base memory section address of said second contiguous memory section, an order number of said particular thread in said second set of threads, and said second memory space size.

7. The method of claim 1, further comprising storing thread data of a particular thread in the memory space allocated to said particular thread.

8. A method for accessing memory resources allocated to a plurality of threads simultaneously executable in a graphics processor, comprising:

determining a set of threads, each of a same thread type, from said plurality of threads simultaneously executable in said graphics processor;

determining a contiguous memory section to be allocated to said set of threads, and allocating a memory space in said contiguous memory section to each thread in said set of threads;

receiving an access command from a first thread in said set of threads;

accessing a first memory space in said contiguous memory section that has been allocated to the first thread in said set of threads in response to said access command received from said first thread;

receiving another access command from a second thread in said set of threads; and accessing a second memory space in said contiguous memory section that has been allocated to the second thread in said set of threads in response to said another access command received from said second thread, wherein said first memory space and second memory space are each comprised of two or more memory locations, and said memory locations of said first memory space are interleaved with said memory locations of said second memory space.

9. The method of claim 8, wherein:

a size of said first memory space is equal to or greater than a memory space amount needed by said first thread; and a size of said second memory space is equal to or greater than a memory space amount needed by said second thread.

10. The method of claim 9, further comprising:

receiving a first sample to be processed by said first thread; and receiving a second sample to be processed by said second thread;

wherein said first memory space is accessed only by said first thread during processing of said first sample by said first thread, and said second memory space is accessed only by said second thread during processing of said second sample by said second thread.

11. The method of claim 9, wherein said first memory space size is equal to said second memory space size.

12. The method of claim 11, further comprising:

determining a base memory section address of said contiguous memory section;

determining a size of memory spaces in said contiguous memory section; and determining a base memory space address of said first memory space based on said base memory section address of said contiguous memory section, an order number of said first thread in said set of threads, and said size of memory spaces in said contiguous memory section.

13. The method of claim 12, wherein said base memory space address is computed using a predefined equation.

14. The method of claim 12, wherein said base memory space address is computed using a predefined order of concatenation.

15. The method of claim 12, wherein said first memory space is comprised of one or more memory locations, the method further comprising:

receiving a memory location offset; and determining a memory location address of a memory location in said first memory space based on said base memory section address of said contiguous memory section, an order number of said first thread in said set of threads, said size of memory spaces in said contiguous memory section, and said memory location offset.

16. The method of claim 15, wherein said memory location address is computed using a predefined equation.

17. The method of claim 15, wherein said memory location address is computed using a predefined order of concatenation.

18. The method of claim 15, wherein a maximum memory location offset is equal to a number of memory locations contained in said first memory space minus one, and if a memory location offset that is greater than said maximum memory location offset is received, setting said memory location offset to be equal to said maximum memory location offset.

19. The method of claim 18, further comprising setting an error condition indicator.

20. The method of claim 12, further comprising:

determining another set of threads, each of a same thread type;

determining another contiguous memory section to be allocated for the threads in said another set of threads;

receiving an access command from a particular thread in said another set of threads; and accessing a memory space in said another contiguous memory section in response to said access command from said particular thread.

21. The method of claim 20, further comprising:

determining a base memory section address of said another contiguous memory section;

determining a size of memory spaces in said another contiguous memory section; and determining a base memory space address of said memory space in said another contiguous memory section based on said base memory section address of said another contiguous memory section, an order number of said particular thread in said another set of threads, and the size of memory spaces in said another contiguous memory section.

22. The method of claim 8, wherein said first memory space stores thread data from another memory space.

23. The method of claim 22, wherein said first memory space and said other memory space are implemented as stacks, said method further comprising:

pushing thread data onto said first memory space from said other memory space upon determining that thread data stored in said other memory space has reached a first predetermined threshold; and popping thread data from said first memory space onto said other memory space upon determining that thread data stored in said other memory space has reached a second predetermined threshold.

24. A computer program product having a computer readable medium having computer program instructions recorded thereon, said computer program product comprising:

instructions for determining a first set of threads, each of a first thread type, and a second set of threads, each of a second thread type, from a plurality of threads executable in a graphics processor;

instructions for determining a first contiguous memory section to be allocated for said first set of threads and a second contiguous memory section to be allocated for said second set of threads; and instructions for allocating memory spaces in said first contiguous memory section to threads in said first set of threads and memory spaces in said second contiguous memory section to threads in said second set of threads, wherein a memory space allocated to a particular thread in said first set of threads comprises two or more memory locations that are interleaved with two or more memory locations corresponding to memory spaces allocated to other threads in said first set of threads.

25. The computer program product of claim 24, wherein a size of said memory space allocated to each thread in said first set of threads is equal to or greater than said memory space amount needed by said thread to which said memory space is allocated.

26. The computer program product of claim 24, wherein sizes of the memory spaces allocated to the threads in said first set of threads are equal.

27. The computer program product of claim 24, wherein a base memory space of said first contiguous memory section has a base memory section address and is allocated to a first thread in said first set of threads, and a base memory space of said second contiguous memory section has a base memory section address and is allocated to a first thread in said second set of threads.

28. The computer program product of claim 24, wherein:
    each thread in said first set of threads is allocated a memory space having a first memory space size; and
    each thread in said second set of threads is allocated a memory space having a second memory space size.

29. The computer program product of claim 28, wherein:
    a base memory space address of a memory space allocated to a particular thread in said first set of threads is identifiable by a base memory section address of said first contiguous memory section, an order number of said particular thread in said first set of threads, and said first memory space size; and
    a base memory space address of a memory space allocated to a particular thread in said second set of threads is identifiable by a base memory section address of said second contiguous memory section, an order number of said particular thread in said second set of threads, and said second memory space size.

30. The computer program product of claim 24, further comprising instructions for storing thread data of a particular thread in the memory space allocated to said particular thread.

31. The computer program product of claim 24, wherein said graphics processor is comprised of a programmable vertex processor.

32. The computer program product of claim 24, wherein said graphics processor is comprised of a programmable shader processor.

33. A computer program product having a computer readable medium having computer program instructions recorded thereon, said computer program product comprising:
    instructions for determining a set of threads, each of a same thread type, from a plurality of threads executable in a graphics processor;
    instructions for determining a contiguous memory section to be allocated to said set of threads, and allocating a memory space in said contiguous memory section to each thread in said set of threads;
    instructions for receiving an access command from a first thread in said set of threads;
    instructions for accessing a first memory space in said contiguous memory section in response to said access command received from said first thread;
    instructions for receiving another access command from a second thread in said first set of threads; and
    instructions for accessing a second memory space in said contiguous memory section in response to said another access command received from said second thread, wherein
    said first memory space and second memory space are each comprised of two or more memory locations, and
    said memory locations of said first memory space are interleaved with said memory locations of said second memory space.

34. The computer program product of claim 33, wherein:
    a size of said first memory space is equal to or greater than a memory space amount needed by said first thread; and
    a size of said second memory space is equal to or greater than a memory space amount needed by said second thread.

35. The computer program product of claim 34, further comprising:
    instructions for receiving a first sample to be processed by said first thread; and
    instructions for receiving a second sample to be processed by said second thread,
    wherein said first memory space is accessed only by said first thread during processing of said first sample by said first thread, and said second memory space is accessed only by said second thread during processing of said second sample by said second thread.

36. The computer program product of claim 34, wherein said first memory space size is equal to said second memory space size.

37. The computer program product of claim 36, further comprising:
    instructions for determining a base memory section address of said contiguous memory section;
    instructions for determining a size of memory spaces in said contiguous memory section; and
    instructions for determining a base memory space address of said first memory space based on said base memory section address of said contiguous memory section, an order number of said first thread in said set of threads, and said size of memory spaces in said contiguous memory section.

38. The computer program product of claim 37, wherein said base memory space address is computed using a predefined equation.

39. The computer program product of claim 37, wherein said base memory space address is computed using a predefined order of concatenation.

40. The computer program product of claim 37, wherein said first memory space is comprised of one or more memory locations, the computer program product further comprising:
    instructions for receiving a memory location offset; and
    instructions for determining a memory location address of a memory location in said first memory space based on said base memory section address of said contiguous memory section, an order number of said first thread in said set of threads, said size of memory spaces in said contiguous memory section, and said memory location offset.

41. The computer program product of claim 40, wherein said memory location address is computed using a predefined equation.

42. The computer program product of claim 40, wherein said memory location address is computed using a predefined order of concatenation.

43. The computer program product of claim 40, wherein a maximum memory location offset is equal to a number of memory locations contained in said first memory space minus one, and if a memory location offset that is greater than said maximum memory location offset is received, setting said memory location offset to be equal to said maximum memory location offset.

44. The computer program product of claim 43, further comprising:
    instructions for setting an error condition indicator.

45. The computer program product of claim 37, further comprising:
    instructions for determining another set of threads, each of a same thread type;
    instructions for determining another contiguous memory section to be allocated for the threads in said another set of threads;
    instructions for receiving an access command from a particular thread in said another set of threads; and instructions for accessing a memory space in said another contiguous memory section in response to said access command from said particular thread.

46. The computer program product of claim 45, further comprising:

instructions for determining a base memory section address of said another contiguous memory section;

instructions for determining a size of memory spaces in said another contiguous memory section; and instructions for determining a base memory space address of said memory space in said another contiguous memory section based on said base memory section address of said another contiguous memory section, an order number of said particular thread in said another set of threads, and the size of memory spaces in said another contiguous memory section.

47. The computer program product of claim 33, wherein said first memory space stores thread data from another memory space.

48. The computer program product of claim 47, wherein said first memory space and said other memory space are implemented as stacks, said method further comprising:

instructions for pushing thread data onto said first memory space from said other memory space upon determining that thread data stored in said other memory space has reached a first predetermined threshold; and instructions for popping thread data from said first memory space onto said other memory space upon determining that thread data stored in said other memory space has reached a second predetermined threshold.

49. The computer program product of claim 33, wherein said graphics processor is comprised of a programmable vertex processor.

50. The computer program product of claim 33, wherein said graphics processor is comprised of a programmable shader processor.

* * * * *

UNITED STATES PATENT AND TRADEMARK OFFICE
CERTIFICATE OF CORRECTION

| | |
|---|---|
| PATENT NO. | : 7,233,335 B2 |
| APPLICATION NO. | : 10/419524 |
| DATED | : June 19, 2007 |
| INVENTOR(S) | : Moreton et al. |

It is certified that error appears in the above-identified patent and that said Letters Patent is hereby corrected as shown below:

On the title page, item 73, replace "NIVIDIA", with --NVIDIA--

Signed and Sealed this

Twenty Second Day of April, 2008

JON W. DUDAS
*Director of the United States Patent and Trademark Office*